US012519236B2

(12) United States Patent
Nemoto et al.

(10) Patent No.: US 12,519,236 B2
(45) Date of Patent: Jan. 6, 2026

(54) ANTENNA DEVICE AND COMMUNICATION DEVICE

(71) Applicant: Murata Manufacturing Co., Ltd., Nagaokakyo (JP)

(72) Inventors: Takaya Nemoto, Nagaokakyo (JP); Hideki Ueda, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 173 days.

(21) Appl. No.: 18/597,941

(22) Filed: Mar. 7, 2024

(65) Prior Publication Data

US 2024/0213680 A1 Jun. 27, 2024

Related U.S. Application Data

(63) Continuation of application No. PCT/JP2022/033463, filed on Sep. 6, 2022.

(30) Foreign Application Priority Data

Sep. 28, 2021 (JP) ................................ 2021-157779

(51) Int. Cl.
*H01Q 21/28* (2006.01)
*H01Q 9/04* (2006.01)

(52) U.S. Cl.
CPC ........... *H01Q 9/0407* (2013.01); *H01Q 21/28* (2013.01)

(58) Field of Classification Search
CPC .... H01Q 9/0407; H01Q 21/28; H01Q 21/065; H01Q 21/08; H01Q 13/06; H01Q 21/29; H01P 3/12
See application file for complete search history.

(56) References Cited

U.S. PATENT DOCUMENTS 7,460,060 B2 * 12/2008 Aoki ....................... G01S 13/89 342/368
2017/0294705 A1 10/2017 Khripkov et al.
(Continued)

FOREIGN PATENT DOCUMENTS

JP 2009-141961 A 6/2009
JP 2014-529971 A 11/2014
(Continued)

OTHER PUBLICATIONS

International Search Report and Written Opinion mailed on Nov. 22, 2022, received for PCT Application PCT/JP2022/033463, filed on Sep. 6, 2022, 08 pages including English Translation.

*Primary Examiner* — Dameon E Levi
*Assistant Examiner* — Michael M Bouizza
(74) *Attorney, Agent, or Firm* — XSENSUS LLP

(57) ABSTRACT

An antenna device includes a casing including an inner surface including connected first and second regions with a corner therebetween. A first antenna opposes the first region with a gap therebetween, and a second antenna opposes the second region with a gap therebetween. A first waveguide extends from the first antenna toward the first region, and a second waveguide extends from the second antenna toward the second region. In a perpendicular projection of an end surface of the first waveguide closest to the first antenna on a plane including the first region, an end surface of the waveguide closest to the inner surface is adjacent to the first corner. In a perpendicular projection of an end surface of the second waveguide closest to the second antenna on a plane including the second region, an end surface of the second waveguide closest to the inner surface is adjacent to the corner.

20 Claims, 15 Drawing Sheets

(56) References Cited

U.S. PATENT DOCUMENTS

| | | | |
|---|---|---|---|
| 2017/0309991 | A1 | 10/2017 | Noori et al. |
| 2018/0358686 | A1 | 12/2018 | Park |
| 2020/0021015 | A1 | 1/2020 | Yun et al. |
| 2020/0227821 | A1 | 7/2020 | Wu et al. |
| 2020/0287268 | A1 | 9/2020 | Moon et al. |
| 2020/0381843 | A1 | 12/2020 | Murata et al. |
| 2021/0075105 | A1* | 3/2021 | Kashino ................. H01Q 19/06 |
| 2021/0234278 | A1* | 7/2021 | Futagami ............. H01Q 21/065 |

FOREIGN PATENT DOCUMENTS

| | | | |
|---|---|---|---|
| WO | 2019/163419 | A1 | 8/2019 |
| WO | 2020/066453 | A1 | 4/2020 |
| WO | 2020/170722 | A1 | 8/2020 |

* cited by examiner

ANTENNA DEVICE AND COMMUNICATION DEVICE

CROSS-REFERENCE TO RELATED APPLICATIONS

This application is a continuation of international application no. PCT/JP2022/033463, filed Sep. 6, 2022, which claims a benefit to Japanese application no. 2021-157779, filed Sep. 28, 2021. The entire contents of both prior applications are hereby incorporated by reference.

TECHNICAL FIELD

The present disclosure relates to an antenna device and a communication device.

BACKGROUND ART

An antenna device including a first antenna and a second antenna installed at an angle in relation to one another is known. For example, beamforming antennas are used as the first antenna and the second antenna. This antenna device can realize wider coverage.

CITATION LIST

Patent Document

Patent Document 1: Japanese Unexamined Patent Application Publication No. 2009-141961

SUMMARY

Technical Problem

In a case in which the first antenna and the second antenna are accommodated in a casing, windows which allow radio waves radiated from the first antenna and the second antenna to be radiated outside the casing are provided in front of the first antenna and the second antenna. The two windows operate as secondary wave sources. Since the first antenna and the second antenna are arranged at an angle in relation to one another, a gap between the two windows provided to the casing, that is, a gap between the secondary wave sources is wider than a gap between the first antenna and the second antenna. Therefore, a side lobe and a grating lobe easily occur.

Aspects of the present disclosure provide an antenna device having a configuration in which two antenna elements facing in different directions are accommodated a casing, and unlikely to cause a side lobe and a grating lobe. Aspects of the present disclosure also provide a communication device mounted with the antenna device.

Solution to Problem

According to an aspect of the present disclosure, there is provided a communication device including a casing including an inner surface including a first region and a second region connected one another with a first corner portion interposed therebetween;

at least one first antenna element accommodated in the casing and opposed to the first region while having a gap therebetween;

at least one second antenna element accommodated in the casing and opposed to the second region while having a gap therebetween;

at least one first waveguide extending from the first antenna element toward the first region; and at least one second waveguide extending from the second antenna element toward the second region;

in which compared to an image obtained by a perpendicular projection of an end surface of the first waveguide on a side closest to the first antenna element on a virtual plane including the first region, an end surface of the first waveguide on a side closest to an inner surface of the casing is positioned adjacent to the first corner portion, and compared to an image obtained by a perpendicular projection of an end surface of the second waveguide on a side closest to the second antenna element on a virtual plane including the second region, an end surface of the second waveguide on a side closest to the inner surface of the casing is positioned adjacent to the first corner portion.

According to another aspect of the present disclosure, there is provided a communication device including the antenna device, and a radio frequency integrated circuit configured to supply a radio frequency signal to at least the first antenna element and the second antenna element of the antenna device.

Advantageous Effects

The end surface of each of the first waveguide and the second waveguide at the casing-inner-surface side operates as a secondary wave source. By the above-described configuration being adopted, the secondary wave source of the first antenna element and the secondary wave source of the second antenna element are brought closer to each other. Therefore, a side lobe and a grating lobe can be suppressed.

DETAILED DESCRIPTION

First Example

An antenna device according to a first example is described with reference to FIGS. 1A, 1B, and 1C, and FIG. 2.

Figure 1A:
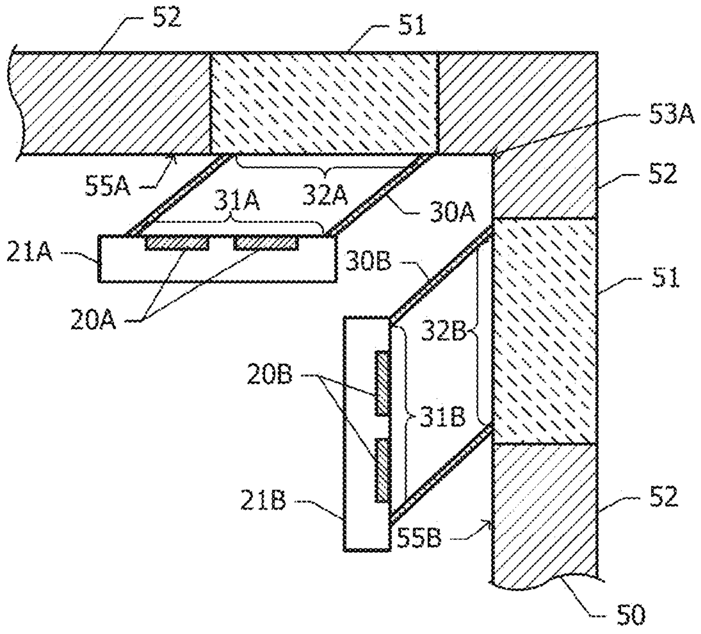
FIG. 1A is a partial sectional view of an antenna device according to a first example.

FIG. 1A is a partial sectional view of the antenna device according to the first example. A casing 50 accommodates a plurality of first antenna elements 20A and a plurality of second antenna elements 20B. For example, two first antenna elements 20A and two second antenna elements 20B are provided. Note that the number of the first antenna elements 20A may be one, or three or more. Similarly, the number of the second antenna elements 20B may be one, or three or more.

The casing 50 has an inner surface including a first region 55A and a second region 55B connected one another with a first corner portion 53A interposed therebetween. A virtual plane including the first region 55A and a virtual plane including the second region 55B intersect one another at a right angle. That is, the first corner portion 53A is configured by straight lines formed by two planes intersecting one another. Note that the first corner portion 53A is not necessarily a pointed corner portion formed by two planes intersecting one another. For example, the first region 55A and the second region 55B may be connected one another with a curved surface having a certain curvature interposed therebetween, or connected one another with a plane having inclination with respect to both the first region 55A and the second region 55B interposed therebetween.

The first antenna element 20A is a patch antenna provided to a first substrate 21A, and the second antenna element 20B is a patch antenna provided to a second substrate 21B. The first antenna element 20A is fixed inside the casing 50 in a posture opposed to the first region 55A while having a gap therebetween. The second antenna element 20B is fixed inside the casing 50 in a posture opposed to the second region 55B while having a gap therebetween.

The plurality of first antenna elements 20A are arranged side by side in a direction parallel to a plane (corresponding to the paper surface of FIG. 1A) perpendicular to an intersection line between the first region 55A and the second region 55B, and parallel to the first region 55A. The plurality of second antenna elements 20B are arranged side by side in a direction parallel to the plane perpendicular to the intersection line between the first region 55A and the second region 55B, and parallel to the second region 55B.

A first waveguide 30A extends from the first antenna element 20A toward the first region 55A. When the first substrate 21A is viewed in plan, the plurality of first antenna elements 20A are encompassed in an end surface 31A (hereinafter, referred to as an antenna-side end surface) of the first waveguide 30A on a side closer to the first antenna element 20A. Similarly, a second waveguide 30B extends from the second antenna element 20B toward the second region 55B. When the second substrate 21B is viewed in plan, the plurality of second antenna elements 20B are encompassed in an antenna-side end surface 31B of the second waveguide 30B. Metal waveguides are used for the first waveguide 30A and the second waveguide 30B. The "end surface of the waveguide" means an opening surface at an end portion of the metal waveguide.

For example, the antenna-side end surface 31A of the first waveguide 30A and the antenna-side end surface 31B of the second waveguide 30B are respectively in contact with the first substrate 21A and the second substrate 21B. Note that a gap may be provided between the antenna-side end surface 31A of the first waveguide 30A and the first substrate 21A, and between the antenna-side end surface 31B of the second waveguide 30B and the second substrate 21B, as long as sufficient electromagnetic coupling can be obtained between the first antenna element 20A and the first waveguide 30A, and between the second antenna element 20B and the second waveguide 30B.

When the first region 55A is viewed in plan, a window 51 made of a material (for example, a dielectric material) that allows a radio wave to pass therethrough is provided to a region of the casing 50, the region encompassing an end surface 32A (hereinafter, referred to as a casing-side end surface) of the first waveguide 30A on a side closer to an inner surface of the casing 50. Similarly, when the second region 55B is viewed in plan, the window 51 made of a material (for example, a dielectric material) that allows a radio wave to pass therethrough is provided to a region of the casing 50, the region encompassing a casing-side end surface 32B of the second waveguide 30B. A circumference of the window 51 of the casing 50 is configured by a metal wall 52.

For example, the casing-side end surface 32A of the first waveguide 30A and the casing-side end surface 32B of the second waveguide 30B are respectively in contact with the first region 55A and the second region 55B. Note that a gap may be provided between the casing-side end surface 32A of the first waveguide 30A and the first region 55A, and between the casing-side end surface 32B of the second waveguide 30B and the second region 55B.

For example, a sectional area of the first waveguide 30A, the sectional area being in parallel to the first region 55A, is constant between the antenna-side end surface 31A and the casing-side end surface 32A. Note that the sectional area of the first waveguide 30A, the sectional area being in parallel to the first region 55A, may be made to gradually increase from the antenna-side end surface 31A toward the casing-side end surface 32A. Similarly, a sectional area of the second waveguide 30B, the sectional area being in parallel to the second region 55B, is constant between the antenna-side end surface 31B and the casing-side end surface 32B. Note that similarly to the first waveguide 30A, the sectional area of the second waveguide 30B, the sectional area being in parallel to the second region 55B, may be made to gradually increase from the antenna-side end surface 31B toward the casing-side end surface 32B.

Figure 1B:
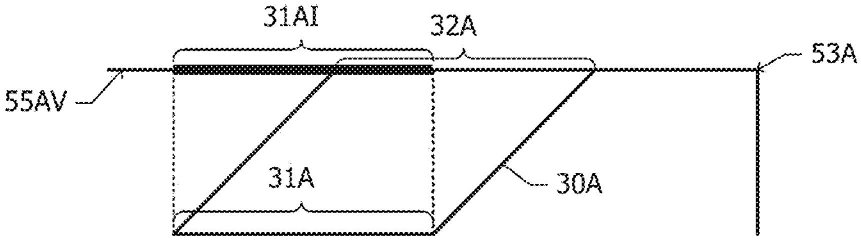
FIG. 1B is a schematic diagram illustrating the positional relationship between an end surface of a first waveguide 30A and a first corner portion 53A.

FIG. 1B is a schematic diagram illustrating the positional relationship between an end surface of the first waveguide 30A and the first corner portion 53A. Comparing to an image 31AI obtained by perpendicularly projecting the antenna-side end surface 31A of the first waveguide 30A on a virtual plane 55AV including the first region 55A (FIG. 1A), the casing-side end surface 32A of the first waveguide 30A is positioned close to the first corner portion 53A. That is, the first waveguide 30A is inclined toward the first corner portion 53A side, with respect to the direction in which the first region 55A is viewed perpendicularly from the first antenna element 20A. As criteria for determination of which one of the image 31AI and the casing-side end surface 32A is closer to the first corner portion 53A, geometric centers of the image 31AI and the casing-side end surface 32A may be adopted.

Similarly, comparing to an image obtained by perpendicularly projecting the antenna-side end surface 31B of the second waveguide 30B on a virtual plane including the second region 55B, the casing-side end surface 32B of the second waveguide 30B is positioned close to the first corner portion 53A. That is, the second waveguide 30B is inclined toward the first corner portion 53A side, with respect to the direction in which the second region 55B is viewed perpendicularly from the second antenna element 20B.

Figure 1C:
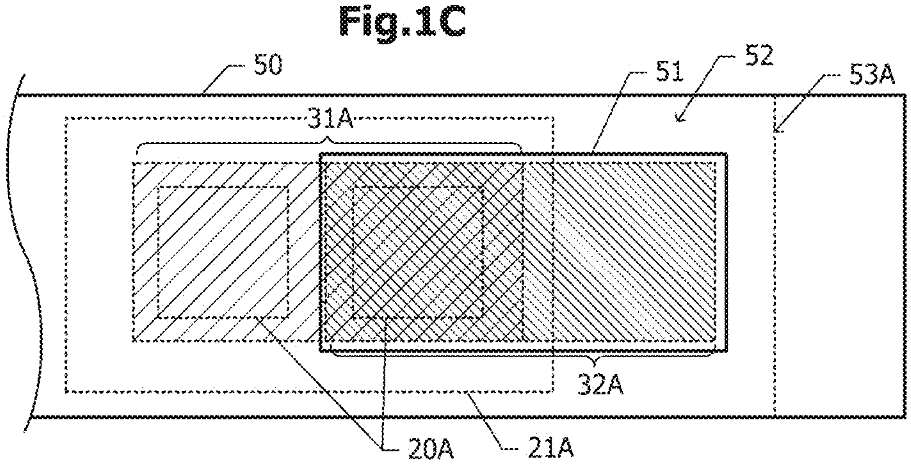
FIG. 1C is a side view in which a casing is viewed from a front direction of a first antenna element.

FIG. 1C is a side view in which the casing 50 is viewed from a front direction of the first antenna element 20A. A front direction of the first antenna element 20A corresponds to a direction normal to a surface of the first substrate 21A where the first antenna element 20A is disposed. The casing 50 includes the window 51 and the metal wall 52 surrounding the window 51. The casing-side end surface 32A of the first waveguide 30A (FIG. 1A) is disposed to be encompassed in the window 51. In plan view, the antenna-side end surface 31A of the first waveguide 30A is disposed at a position where the casing-side end surface 32A is parallelly shifted in a direction to separate from the first corner portion 53A. In FIG. 1C, the antenna-side end surface 31A of the first waveguide 30A is less densely hatched with lines slanting up from left to right, and the casing-side end surface 32A is densely hatched with lines slanting down from left to right.

For example, shapes of the antenna-side end surface 31A and the casing-side end surface 32A of the first waveguide 30A are both rectangles in the same size. The antenna-side end surface 31A and the casing-side end surface 32A of the first waveguide 30A partially overlap each other in plan view. Note that the inclination of the first waveguide 30A may be increased, so that the antenna-side end surface 31A and the casing-side end surface 32A of the first waveguide 30A do not overlap each other. The plurality of first antenna elements 20A are encompassed in the antenna-side end surface 31A of the first waveguide 30A. The plurality of first antenna elements 20A are arranged side by side in the direction orthogonal to the intersection line (first corner portion 53A) between the first region 55A and the second region 55B (FIG. 1A).

Relative positional relationship between the second antenna element 20B, the second waveguide 30B, and the window 51 is the same as the relative positional relationship between the first antenna element 20A, the first waveguide 30A, and the window 51.

Next, a beneficial effect of the first example is described.

In the first example, radio waves radiated from the first antenna element 20A and the second antenna element 20B are respectively guided to the casing-side end surfaces 32A and 32B of the first waveguide 30A and the second waveguide 30B by the first waveguide 30A and the second waveguide 30B. The first antenna element 20A and the second antenna element 20B operate as primary wave sources, and the respective casing-side end surfaces 32A and 32B of the first waveguide 30A and the second waveguide 30B operate as secondary wave sources. That is, each point on the respective casing-side end surfaces 32A and 32B of the first waveguide 30A and the second waveguide 30B serves as a wave source of a secondary wave based on Huygens-Fresnel principle. The two surfaces where the secondary wave sources are disposed are facing in directions different from each other. Therefore, beamforming in two array directions, which is an array direction of the plurality of first antenna elements 20A and an array direction of the plurality of second antenna elements 20B, is possible. By each of the plurality of first antenna elements 20A and the plurality of second antenna elements 20B operating as a beamforming antenna, wider range coverage can be achieved.

When beamforming in an outward direction to which the first corner portion 53A is directed (diagonally upper right in FIG. 1A) is intended, the plurality of first antenna elements 20A and the plurality of second antenna elements 20B may be operated as a single array antenna. By a gap between the casing-side end surface 32A of the first waveguide 30A and the casing-side end surface 32B of the second waveguide 30B which operate as the secondary wave sources being narrowed, a side lobe and a grating lobe can be suppressed.

When the first waveguide 30A is extended in the direction normal to the first antenna element 20A, the position of the image 31AI (FIG. 1B) of the antenna-side end surface 31A operates as a secondary wave source. The similar holds for the second antenna element 20B. In the first example, comparing to the image 31AI, the casing-side end surface 32A of the first waveguide 30A is disposed at the position close to the first corner portion 53A, which similarly applies to the second waveguide 30B. Therefore, comparing to the case in which the position of the image 31AI operates as the secondary wave source, the gap between the two secondary wave sources becomes narrow. Thereby, a side lobe and a grating lobe can be suppressed.

Next, the positional relationship between the first waveguide 30A, the second waveguide 30B, the first antenna element 20A, and the second antenna element 20B is described in more detail with reference to FIG. 2.

Figure 2:
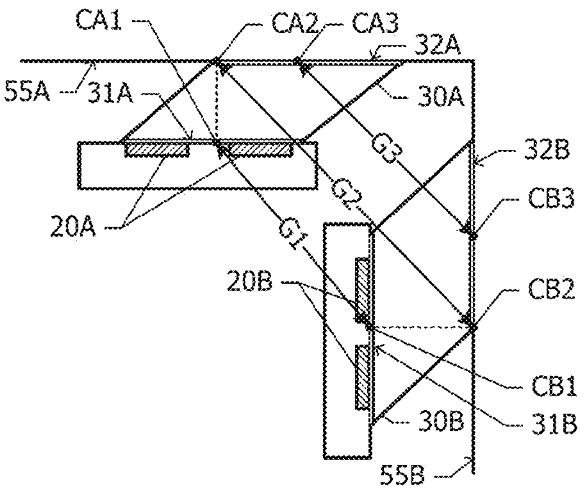
FIG. 2 is a schematic diagram illustrating the positional relationship between the first waveguide, a second waveguide, the first antenna element, and a second antenna element.

FIG. 2 is a schematic diagram illustrating the positional relationship between the first waveguide 30A, the second waveguide 30B, the first antenna element 20A, and the second antenna element 20B. An intersection point between a perpendicular line extended from a geometric center CA1 of the antenna-side end surface 31A of the first waveguide 30A to the first region 55A, and the first region 55A is indicated by CA2. A geometric center of the casing-side end surface 32A of the first waveguide 30A is indicated by CA3. An intersection point between a perpendicular line extended from a geometric center CB1 of the antenna-side end surface 31B of the second waveguide 30B to the second region 55B, and the second region 55B is indicated by CB2. A geometric center of the casing-side end surface 32B of the second waveguide 30B is indicated by CB3.

A gap between the geometric centers CA1 and CB1 is indicated by G1, a gap between the intersection points CA2 and CB2 is indicated by G2, and a gap between the geometric centers CA3 and CB3 is indicated by G3. In the first example, G3<G2 is established. This means that, comparing to the configuration in which the first waveguide 30A and the second waveguide 30B are not inclined, the gap between the two secondary wave sources is narrowed. Note that the gaps G1 and G3 are substantially equal to each other. This means that the gap between the two primary wave sources is substantially equal to the gap between the two secondary wave sources. Therefore, even when the first antenna element 20A and the second antenna element 20B are accommodated in the casing 50, a side lobe and a grating lobe can be suppressed to the same extent as before the accommodation.

Normally, the geometric center CA1 of the antenna-side end surface 31A of the first waveguide 30A substantially matches a geometric center of the plurality of first antenna elements 20A when the first antenna elements 20A are viewed in plan. Similarly, normally, the geometric center CB1 of the antenna-side end surface 31B of the second waveguide 30B substantially matches a geometric center of the plurality of second antenna elements 20B when the second antenna elements 20B are viewed in plan. Therefore, as the gap G1, a gap between the geometric center of the plurality of first antenna elements 20A and the geometric center of the plurality of second antenna elements 20B may be adopted.

Next, one modification of the first example is described with reference to FIG. 3.

Figure 3:
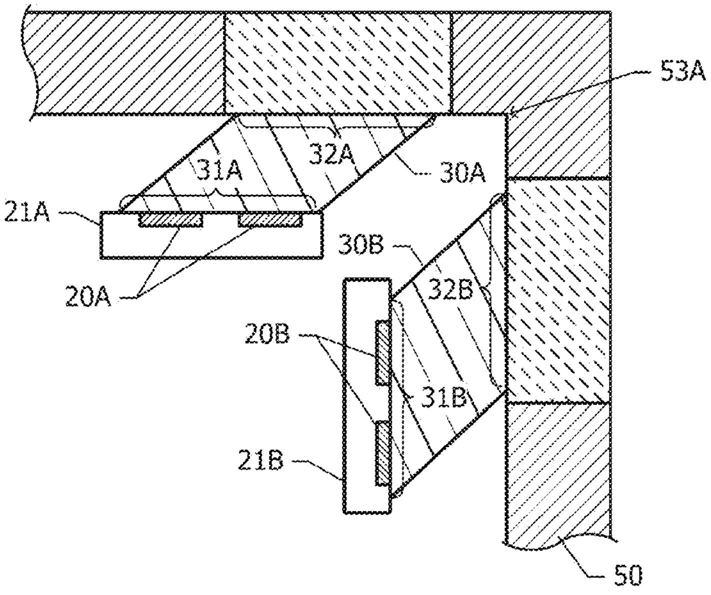
FIG. 3 is a sectional view of an antenna device according to one modification of the first example.

FIG. 3 is a sectional view of an antenna device according to one modification of the first example. In the first example (FIG. 1A), metal waveguides are used for the first waveguide 30A and the second waveguide 30B. In this respect, in the modification of the first example illustrated in FIG. 3, dielectric waveguides are used for the first waveguide 30A and the second waveguide 30B. The antenna-side end surface 31A and the casing-side end surface 32A of the first waveguide 30A respectively correspond to an end surface of the dielectric waveguide facing to the first antenna element 20A, and an end surface of the dielectric waveguide facing to the inner surface of the casing 50. The similar holds for the second waveguide 30B. Permittivity of the dielectric waveguide is higher than permittivity in a peripheral space. Like this modification, dielectric waveguides may be used as the first waveguide 30A and the second waveguide 30B.

A metal waveguide may be used for one of the first waveguide 30A and the second waveguide 30B, and a dielectric waveguide may be used for the other one of the first waveguide 30A and the second waveguide 30B. An internal space of the metal waveguide may be in an atmosphere condition, or the internal space of the metal waveguide may be filled with a dielectric material.

Next, another modification of the first example is described with reference to FIG. 4.

Figure 4:
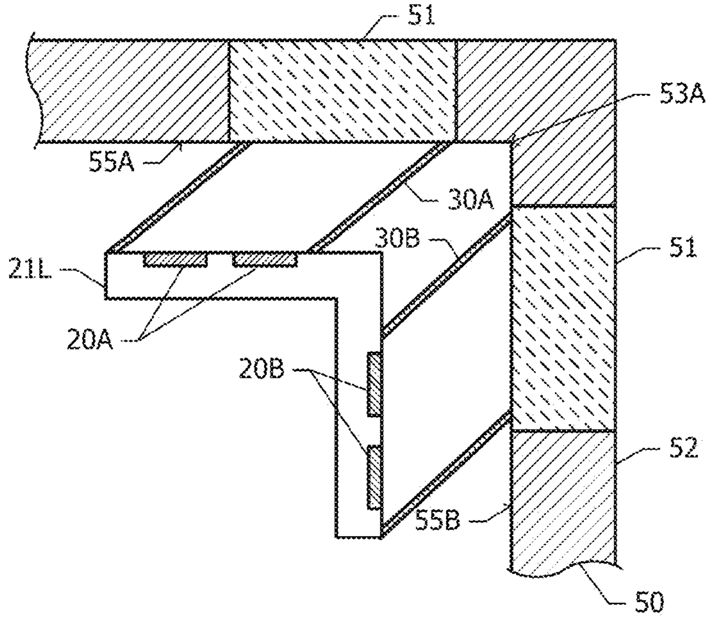
FIG. 4 is a sectional view of an antenna device according to another modification of the first example.

FIG. 4 is a sectional view of an antenna device according to another modification of the first example. In the first example (FIG. 1A), the first antenna element 20A is disposed at the first substrate 21A, and the second antenna element 20B is disposed at the second substrate 21B different from the first substrate 21A. In this respect, in the modification of the first example illustrated in FIG. 4, the first antenna element 20A and the second antenna element 20B are provided to a common L-shaped substrate 21L.

The L-shaped substrate 21L has a shape bent in an L shape at a bent portion. Each of surfaces on both sides of the bent portion is opposed to the first region 55A or the second region 55B of the inner surface of the casing 50. The first antenna element 20A is disposed on the surface opposed to the first region 55A, and the second antenna element 20B is disposed on the surface opposed to the second region 55B.

Like the modification illustrated in FIG. 4, the use of the L-shaped substrate 21L can reduce the number of components. Moreover, a work to mount the L-shaped substrate 21L in the casing 50 can be simplified.

Next, further another modification of the first example is described. In the first example (FIG. 1A), the plurality of first antenna elements 20A are arranged in a row in the direction parallel to the plane orthogonal to the intersection line between the first region 55A and the second region 55B, and parallel to the first region 55A. The modification may have a configuration in which the plurality of first antenna elements 20A are arranged in a row in parallel to the intersection line between the first region 55A and the second region 55B. Alternatively, the plurality of first antenna elements 20A may be arranged in a matrix manner. The similar holds for the second antenna element 20B.

Second Example

Next, an antenna device according to a second example is described with reference to FIGS. 5A and 5B. Hereinafter, description of configurations in common with the antenna device according to the first example which is described with reference to the drawings from FIGS. 1A to 2 is omitted.

Figure 5A:
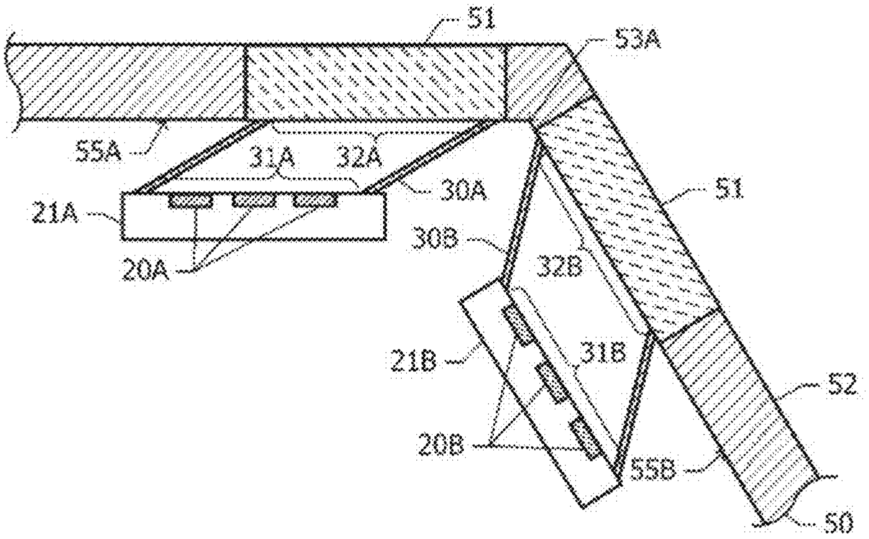
FIG. 5A is a partial sectional view of an antenna device according to a second example.

FIG. 5A is a partial sectional view of the antenna device according to the second example. In the first example (FIG. 1A), the first region 55A and the second region 55B of the inner surface of the casing 50 intersect one another at a substantially right angle at the first corner portion 53A. In this respect, in the second example, an angle formed between the first region 55A and the second region 55B is an obtuse angle. Similarly to the first example, comparing to an image obtained by perpendicularly projecting the antenna-side end surface 31A on a virtual plane including the first region 55A, the casing-side end surface 32A of the first waveguide 30A is disposed at a position close to the first corner portion 53A. However, a deviation amount of the casing-side end surface 32A of the first waveguide 30A toward the first corner portion 53A is larger than a deviation amount in the first example. The similar holds for the second waveguide 30B.

Note that, in FIG. 5A, three first antenna elements 20A and three second antenna elements 20B are provided. However, two first antenna elements 20A and two second antenna elements 20B may be provided similarly to the first example (FIG. 1A), or one or four or more first antenna elements 20A and one or four or more second antenna elements 20B may be provided.

Figure 5B:
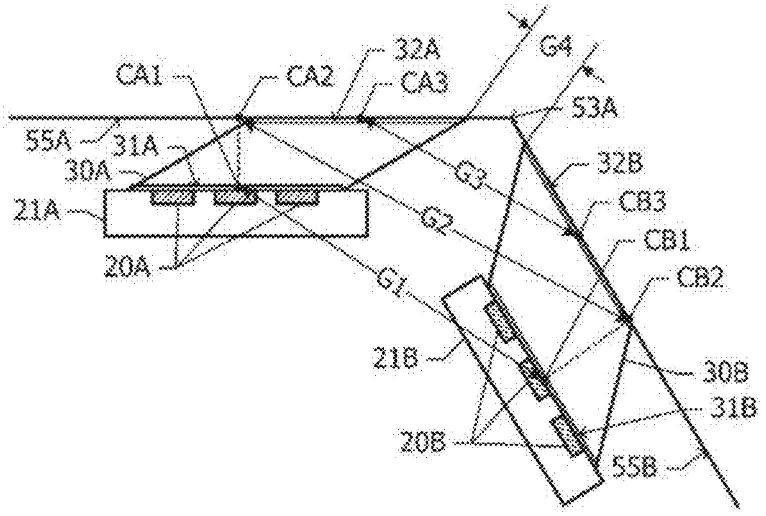
FIG. 5B is a schematic diagram illustrating the positional relationship between the first waveguide, the second waveguide, the first antenna element, and the second antenna element.

FIG. 5B is a schematic diagram illustrating the positional relationship between the first waveguide 30A, the second waveguide 30B, the first antenna element 20A, and the second antenna element 20B. Definition of the geometric centers CA1, CA3, CB1, and CB3, and the intersection points CA2 and CB2 are similar to the definition in the first example illustrated in FIG. 2. In the first example (FIG. 2), the gap G1 between the geometric centers CA1 and CB1 is substantially equal to the gap G3 between the geometric centers CA3 and CB3. In this respect, in the second example, G3<G1 is established.

Next, a beneficial effect of the second example is described.

In the second example, G3<G1 is established. That is, the gap between the two secondary wave sources is narrow when compared to the first example. Thereby, a beneficial effect that the suppressing effect of a side lobe and a grating lobe is increased, can be obtained.

Next, a preferable gap between the casing-side end surface 32A of the first waveguide 30A and the casing-side end surface 32B of the second waveguide 30B is described. A gap between the casing-side end surface 32A of the first waveguide 30A and the casing-side end surface 32B of the second waveguide 30B at which the casing-side end surface 32A and the casing-side end surface 32B are brought closest is indicated by G4 (FIG. 5B). A free space wavelength corresponding to a lowest frequency (57.24 GHz in a case of WiGig) of an operation frequency band width of the antenna device is indicated by $\lambda_{MAX}$, and a free space wavelength corresponding to a highest frequency (65.88 GHz in the case of WiGig) is indicated by $\lambda_{MIN}$.

The gap G4 is preferably smaller than the wavelength $\lambda_{MAX}$. In this way, at a vicinity of the lowest frequency of the operation frequency band width, the grating lobe issue can be resolved. The gap G4 is more preferably smaller than the wavelength $\lambda_{MIN}$. In this way, in the entire range of the operation frequency band width, the grating lobe issue can be resolved.

Third Example

Next, an antenna device according to a third example is described with reference to FIGS. 6A and 6B. Hereinafter, description of configurations in common with the antenna device according to the first example which is described with reference to the drawings from FIGS. 1A to 2 is omitted.

Figure 6A:
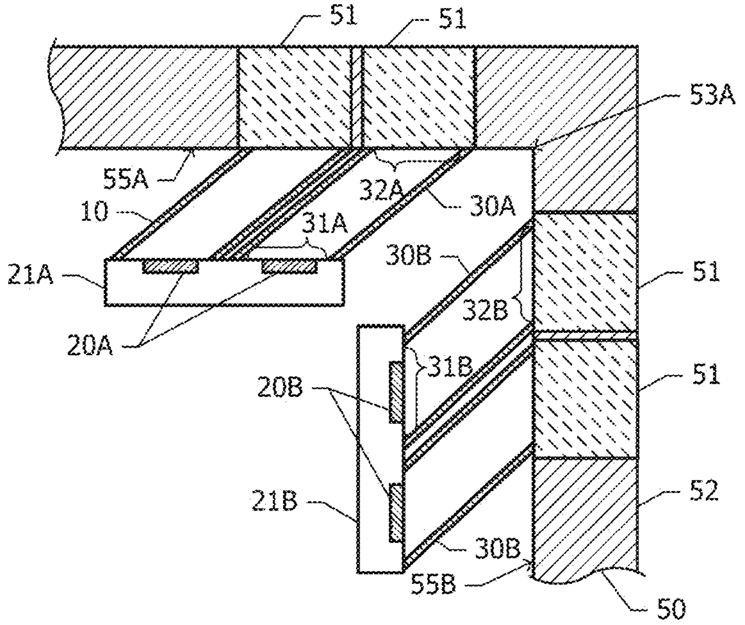
FIG. 6A is a partial sectional view of an antenna device according to a third example.

FIG. 6A is a partial sectional view of the antenna device according to the third example. In the first example (FIG. 1A), one first waveguide 30A is disposed for the plurality of first antenna elements 20A, and one second waveguide 30B is disposed for the plurality of second antenna elements 20B. In this respect, in the third example, the first waveguide 30A is disposed for each first antenna element 20A, and the second waveguide 30B is disposed for each second antenna element 20B. In other words, the plurality of first antenna elements 20A correspond, in a one-to-one manner, to a plurality of first waveguides 30A, and the plurality of second antenna elements 20B correspond, in a one-to-one manner, to a plurality of second waveguides 30B.

In terms of each of the plurality of first waveguides 30A, similarly to the first example (FIGS. 1A and 1B), comparing to an image obtained by perpendicularly projecting the antenna-side end surface 31A on a virtual plane including the first region 55A, the casing-side end surface 32A is positioned close to the first corner portion 53A. Similarly, in terms of each of the plurality of second waveguides 30B, comparing to an image obtained by perpendicularly projecting the antenna-side end surface 31B on a virtual plane including the second region 55B, the casing-side end surface 32B is positioned close to the first corner portion 53A.

Figure 6B:
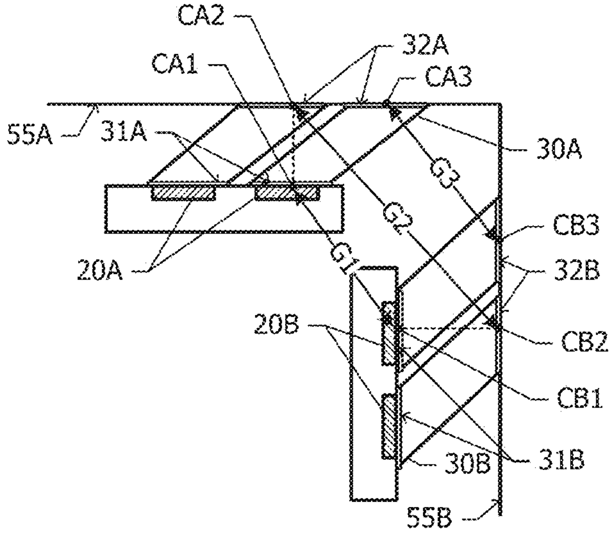
FIG. 6B is a schematic diagram illustrating the positional relationship between the first waveguide, the second waveguide, the first antenna element, and the second antenna element.

FIG. 6B is a schematic diagram illustrating the positional relationship between the first waveguide 30A, the second waveguide 30B, the first antenna element 20A, and the second antenna element 20B. The geometric center CA1, the intersection point CA2, and the geometric center CA3 are defined for each of the plurality of first waveguides 30A, and the geometric center CB1, the intersection point CB2, and the geometric center CB3 are defined for each of the plurality of second waveguides 30B. In FIG. 6B, the geometric center CA1, the intersection point CA2, and the geometric center CA3, and the geometric center CB1, the intersection point CB2, and the geometric center CB3 are presented only regarding one first waveguide 30A and one second waveguide 30B.

In terms of each combination of one first waveguide 30A selected from the plurality of first waveguides 30A and one second waveguide 30B selected from the plurality of second waveguides 30B, the gap G1 between the geometric centers CA1 and CB1 is substantially equal to the gap G3 between the geometric centers CA3 and CB3. Furthermore, in terms of each combination of the first waveguide 30A and the second waveguide 30B, the gap G3 between the geometric centers CA3 and CB3 is narrower than the gap G2 between the intersection points CA2 and CB2.

Next, a beneficial effect of the third example is described.

Also in the third example, similarly to the first example, G3<G2 is established, and thus a side lobe and a grating lobe can be suppressed. Moreover, in the first example, since one first waveguide 30A is coupled to the plurality of first antenna elements 20A, signals of the plurality of first antenna elements 20A may overlap one another inside the first waveguide 30A, which may cause difficulty in directivity control. In this respect, in the third example, phases for the plurality of first waveguides 30A and the plurality of second waveguides 30B at the casing-side end surfaces 32A and 32B can be controlled individually, and thus directivity control can be made easier.

Moreover, in the first example, since the cross sections of the first waveguide 30A and the second waveguide 30B are large, a higher mode may occur in the waveguides. In this respect, in the third example, since the cross sections of the first waveguide 30A and the second waveguide 30B are small, occurrence of the higher mode is suppressed.

Next, a modification of the third example is described.

In the third example, the first antenna element 20A is coupled to the first waveguide 30A. At this coupling part, an end portion of a microstrip line may be disposed instead of the first antenna element 20A, and a microstrip line-waveguide converter may be configured. In this case, the portion of the microstrip line coupled to the waveguide may be referred to as the first antenna element 20A. Similarly, a microstrip line-waveguide converter may be used at the coupling part between the second antenna element 20B and second waveguide 30B.

Fourth Example

Next, an antenna device according to a fourth example is described with reference to FIGS. 7A and 7B. Hereinafter, description of configurations in common with the antenna device according to the third example which is described with reference to FIGS. 6A and 6B is omitted.

Figure 7A:
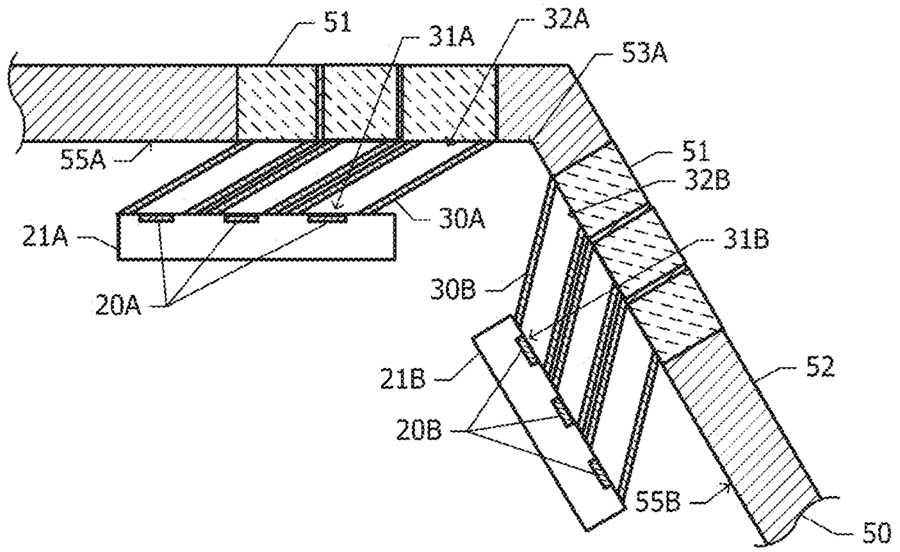
FIG. 7A is a partial sectional view of an antenna device according to a fourth example.

FIG. 7A is a partial sectional view of the antenna device according to the fourth example. In the third example (FIG. 6A), the first region 55A and the second region 55B of the inner surface of the casing 50 intersect one another at a substantially right angle at the first corner portion 53A. In this respect, in the fourth example, an angle formed between the first region 55A and the second region 55B is an obtuse angle. Similarly to the third example, comparing to an image obtained by perpendicularly projecting the antenna-side end surface 31A on a virtual plane including the first region 55A, the casing-side end surface 32A of each of the plurality of first waveguides 30A is disposed at a position close to the first corner portion 53A. However, a deviation amount of the casing-side end surface 32A of each first waveguide 30A toward the first corner portion 53A is larger than the deviation amount in the third example. The similar holds for the second waveguide 30B.

Note that, in FIG. 7A, three first antenna elements 20A and three second antenna elements 20B are provided. However, two first antenna elements 20A and two second antenna elements 20B may be provided similarly to the third example (FIG. 6A), or one or four or more first antenna elements 20A and one or four or more second antenna elements 20B may be provided.

Figure 7B:
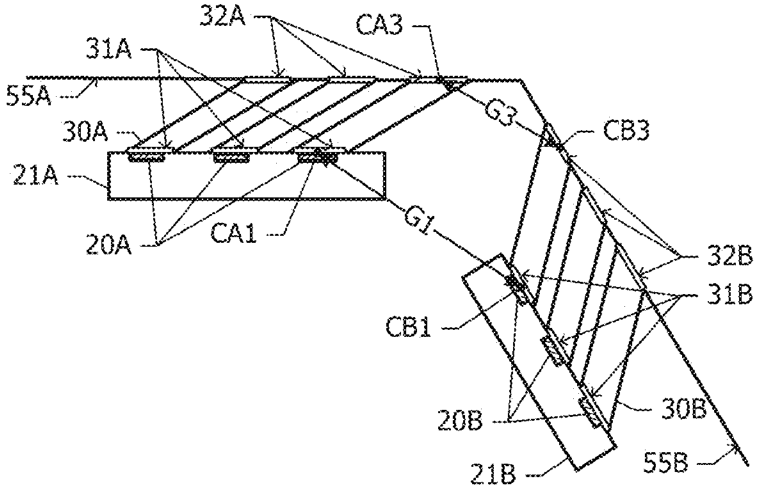
FIG. 7B is a schematic diagram illustrating the positional relationship between the first waveguide, the second waveguide, the first antenna element, and the second antenna element.

FIG. 7B is a schematic diagram illustrating the positional relationship between the first waveguide 30A, the second waveguide 30B, the first antenna element 20A, and the second antenna element 20B. Similarly to the third example (FIG. 6B), the geometric centers CA1 and CA3 are defined for each of the plurality of first waveguides 30A, and the geometric centers CB1 and CB3 are defined for each of the plurality of second waveguides 30B. In FIG. 7B, the geometric centers CA1 and CA3, and the geometric centers CB1 and CB3 are presented only regarding one first waveguide 30A and one second waveguide 30B. In the third example (FIG. 6B), the gap G1 between the geometric centers CA1 and CB1 is substantially equal to the gap G3 between the geometric centers CA3 and CB3. In this respect, in the fourth example, G3<G1 is established.

Next, a beneficial effect of the fourth example is described.

In the fourth example, G3<G1 is established. That is, comparing to the third example, the gap between the secondary wave source constituted by one first waveguide 30A selected from the plurality of first waveguides 30A, and the secondary wave source constituted by one second waveguide 30B selected from the plurality of second waveguides 30B is narrow. Thereby, a beneficial effect that the suppressing effect of a side lobe and a grating lobe is increased, can be obtained.

Fifth Example

Next, an antenna device according to a fifth example is described with reference to FIG. 8. Hereinafter, description of configurations in common with the antenna device according to the first example which is described with reference to the drawings from FIGS. 1A to 2 is omitted.

Figure 8:
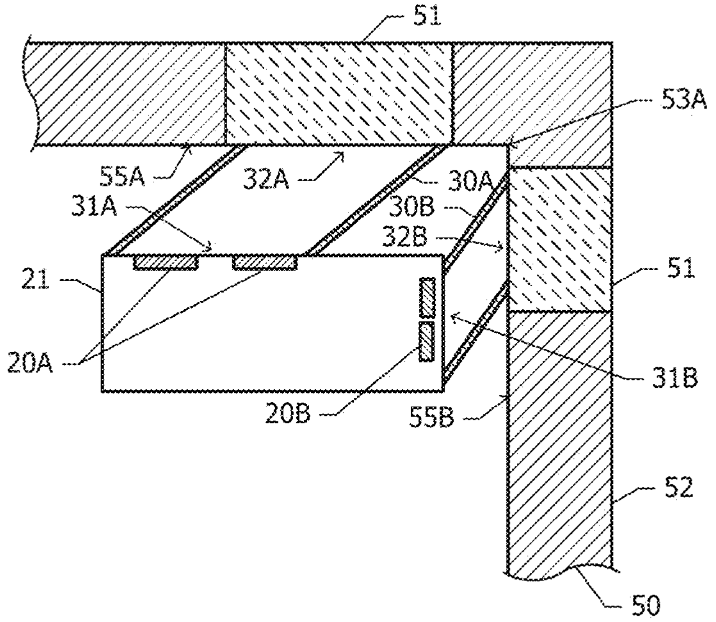
FIG. 8 is a partial sectional view of an antenna device according to a fifth example.

FIG. 8 is a partial sectional view of the antenna device according to the fifth example. In the first example, patch antennas are used as the plurality of first antenna elements 20A and the plurality of second antenna elements 20B. In this respect, in a fifth example, a patch antenna is used as each of the plurality of first antenna elements 20A, and a dipole antenna is used as one second antenna element 20B.

The first antenna element 20A and the second antenna element 20B are disposed at a common substrate 21. The first antenna element 20A is disposed on one front surface of the substrate 21, and the second antenna element 20B is disposed at a vicinity of a side surface of the substrate 21, the side surface facing to the second region 55B. A length direction of the dipole antenna is in parallel to a thickness direction of the substrate 21.

Similarly to the first example (FIG. 1A), one first waveguide 30A is coupled to the plurality of first antenna elements 20A. One second waveguide 30B is coupled to one second antenna element 20B. The positional relationship between the antenna-side end surface 31A and the casing-side end surface 32A of the first waveguide 30A, and the positional relationship between the antenna-side end surface 31B and the casing-side end surface 32B of the second waveguide 30B are similar to the positional relationship according to the first example (FIG. 1A) or the second example (FIG. 5A). The second waveguide 30B is inclined in the length direction of the dipole antenna with respect to the direction in which the second region 55B is viewed perpendicularly from the second antenna element 20B.

Next, a beneficial effect of the fifth example is described.

Also in the fifth example, similarly to the first example or the second example, wider range coverage can be achieved in beamforming, and also a side lobe and a grating lobe can be suppressed. Moreover, in the fifth example, both the first antenna element 20A and the second antenna element 20B can be disposed at the common substrate 21 without using a special substrate such as the L-shaped substrate 21L used in the modification of the first example illustrated in FIG. 4.

Next, a modification of the fifth example is described.

Although, in the fifth example, the length direction of the second antenna element 20B which is the dipole antenna is in parallel to the thickness direction of the substrate 21, the length direction of the second antenna element 20B may be in parallel to the side surface and to the surface where the first antenna element 20A is disposed. In this case, the second waveguide 30B is inclined in a direction orthogonal to the length direction of the dipole antenna with respect to the direction in which the second region 55B is viewed perpendicularly from the second antenna element 20B.

Sixth Example

Next, an antenna device according to a sixth example is described with reference to FIGS. 9A and 9B. Hereinafter, description of configurations in common with the antenna device according to the first example which is described with reference to the drawings from FIGS. 1A to 2 is omitted.

Figure 9A:
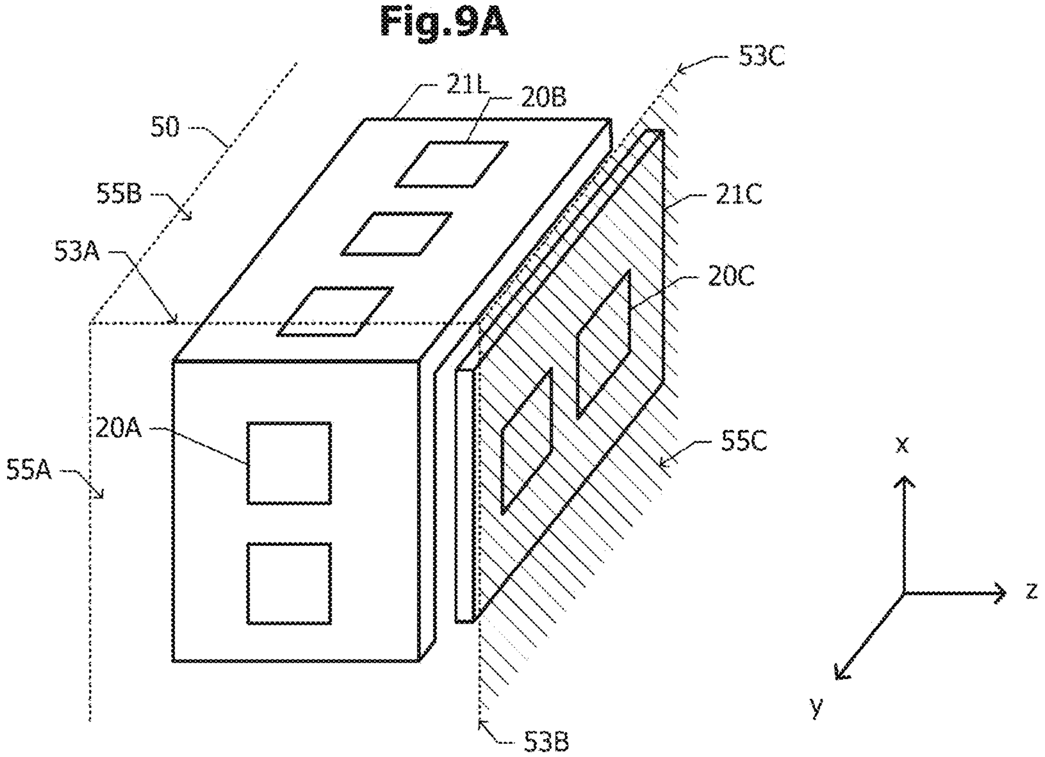
FIG. 9A is a schematic perspective view of an antenna device according to a sixth example.

FIG. 9A is a schematic perspective view of the antenna device according to the sixth example. In FIG. 9A, the casing 50 is indicated by a broken line. The inner surface of the casing 50 includes the first region 55A, the second region 55B, and a third region 55C. In FIG. 9A, the third region 55C is indicated by hatching. The third region 55C is connected to the first region 55A with a second corner portion 53B interposed therebetween, and is connected to the second region 55B with a third corner portion 53C interposed therebetween. The xyz orthogonal coordinate system is defined in a manner such that directions orthogonal to the second region 55B, the first region 55A, and the third region 55C correspond to an x direction, a y direction, and a z direction, respectively.

The casing 50 accommodates, in addition to the plurality of first antenna elements 20A and the plurality of second antenna elements 20B, a plurality of third antenna elements 20C. Note that the number of third antenna elements 20C may be one. Similarly to the antenna device according to the modification of the first example illustrated in FIG. 4, the first antenna element 20A and the second antenna element 20B are disposed at the L-shaped substrate 21L. The plurality of third antenna elements 20C are disposed at a third substrate 21C, and are opposed to the third region 55C while having a gap therebetween. The plurality of third antenna elements 20C are arranged side by side in a direction parallel to the direction (y direction) in which the plurality of second antenna elements 20B are aligned. A patch antenna is used as the third antenna element 20C, for example.

Figure 9B:
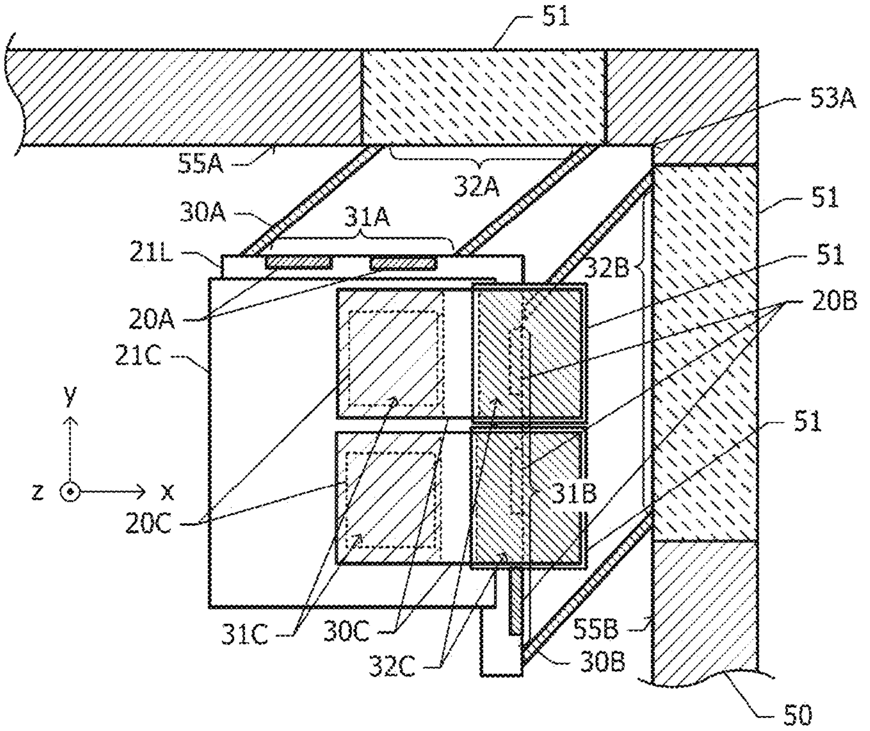
FIG. 9B is a diagram illustrating the positional relationship between the respective components of the antenna device when viewed from a front direction (a direction parallel to a z-axis) of a third antenna element.

FIG. 9B is a diagram illustrating the positional relationship between the respective components of the antenna device when viewed from a front direction (a direction parallel to a z-axis) of the third antenna element 20C. The positional relationship between the first antenna element 20A, the second antenna element 20B, the first waveguide 30A, the second waveguide 30B, and the casing 50 is similar to the positional relationship therebetween in the antenna device according to the modification of the first example illustrated in FIG. 4. Note that, although in FIG. 9B, three second antenna elements 20B are provided, two second antenna elements 20B may be provided like the antenna device illustrated in FIG. 4.

The plurality of third antenna elements 20C are disposed at the third substrates 21C. A third waveguide 30C is disposed for each third antenna element 20C, and extends from each third antenna element 20C toward the third region 55C (FIG. 9A). When the third substrate 21C is viewed in plan, the third antenna element 20C is encompassed in an antenna-side end surface 31C of each third waveguide 30C. In FIG. 9B, the antenna-side end surface 31C of the third waveguide 30C is less densely hatched with lines slanting up from left to right.

Comparing to the antenna-side end surface 31C, a casing-side end surface 32C of each third waveguide 30C is disposed at a position close to the third corner portion 53C (FIG. 9A). A distance from the casing-side end surface 32C of each third waveguide 30C to the first region 55A is equal to a distance from the antenna-side end surface 31C thereof to the first region 55A. In FIG. 9B, the casing-side end surface 32C of the third waveguide 30C is densely hatched with lines slanting down from left to right. The casing 50 is provided with the dielectric window 51 encompassing the casing-side end surface 32C of the third waveguide 30C in plan view.

Next, a beneficial effect of the sixth example is described.

The antenna device according to the sixth example includes the first antenna element 20A, the second antenna element 20B, and the third antenna element 20C respectively opposed to the first region 55A, the second region 55B, and the third region 55C facing in different directions. Therefore, a beamforming range can be extended in three different directions.

Moreover, comparing to the antenna-side end surface 31C, the casing-side end surface 32C of the third waveguide 30C is disposed to be close to the third corner portion 53C. Therefore, a side lobe and a grating lobe can be suppressed when the second antenna element 20B and the third antenna element 20C are operated to perform beamforming.

Next, a modification of the sixth example is described.

In the sixth example, the distance from the casing-side end surface 32C of each third waveguide 30C to the first region 55A is equal to the distance from the antenna-side end surface 31C thereof to the first region 55A. In another configuration, comparing to the antenna-side end surface 31C, the casing-side end surface 32C of each third waveguide 30C may be disposed at a position close to both the first region 55A and the second region 55B. This configuration enables suppression of a side lobe and a grating lobe also when the first antenna element 20A and the third antenna element 20C are operated to perform beamforming. Furthermore, comparing to the antenna-side end surface 31A, the casing-side end surface 32A of the first waveguide 30A may be disposed to be close to the third substrate 21C. Similarly, comparing to the antenna-side end surface 31B, the casing-side end surface 32B of the second waveguide 30B may be disposed to be close to the third substrate 21C. This configuration enables suppression of a side lobe and a grating lobe in a case in which the first antenna element 20A, the second antenna element 20B, and the third antenna element 20C are operated as a single array antenna to perform beamforming.

Although, in the sixth example, the third waveguide 30C is disposed for each third antenna element 20C, one third waveguide 30C may be disposed for the plurality of third antenna elements 20C. Moreover, although, in the sixth example, the first antenna element 20A and the second antenna element 20B are disposed at the L-shaped substrate 21L, the first antenna element 20A and the second antenna element 20B may be disposed at substrates different from each other.

Seventh Example

Next, an antenna device according to a seventh example is described with reference to FIG. 10. Hereinafter, description of configurations in common with the antenna device according to the first example which is described with reference to the drawings from FIGS. 1A to 2 is omitted.

Figure 10:
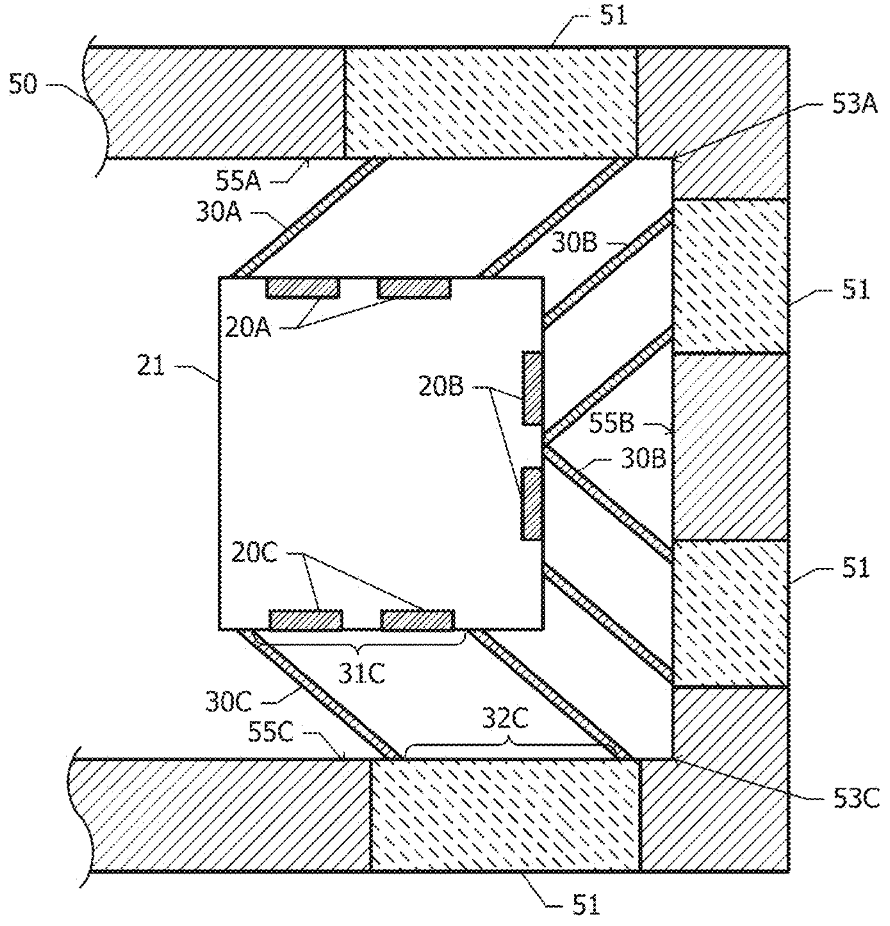
FIG. 10 is a sectional view of an antenna device according to a seventh example.

FIG. 10 is a sectional view of the antenna device according to the seventh example. In the first example (FIG. 1A), the inner surface of the casing 50 includes the first region 55A and the second region 55B, and another region is not mentioned. In the seventh example, the third region 55C is connected to the second region 55B with the third corner portion 53C interposed therebetween. The third region 55C is opposed to the first region 55A. The plurality of first antenna elements 20A, the plurality of second antenna elements 20B, and the plurality of third antenna elements 20C are disposed at a space sandwiched between the first region 55A and the third region 55C.

The plurality of third antenna elements 20C are opposed to the third region 55C while having a gap therebetween. The third waveguide 30C extends from the plurality of third antenna elements 20C toward the third region 55C. Comparing to an image obtained by perpendicularly projecting the antenna-side end surface 31C on a virtual plane including the third region 55C, the casing-side end surface 32C of the third waveguide 30C is disposed at a position close to the third corner portion 53C.

The plurality of second antenna elements 20B are arranged side by side in a direction from the third region 55C toward the first region 55A. The second waveguide 30B is disposed for each of the plurality of second antenna elements 20B. In terms of the second waveguide 30B coupled to the second antenna element 20B positioned close to the first region 55A, the casing-side end surface 32B is disposed at a position close to the first corner portion 53A comparing to an image obtained by perpendicularly projecting the antenna-side end surface 31B on a virtual plane including the second region 55B. In terms of the second waveguide 30B coupled to the second antenna element 20B positioned close to the third region 55C, the casing-side end surface 32B is disposed at a position close to the third corner portion 53C comparing to an image obtained by perpendicularly projecting the antenna-side end surface 31B on a virtual plane including the second region 55B.

Next, a beneficial effect of the seventh example is described.

The antenna device according to the seventh example includes the first antenna element 20A, the second antenna element 20B, and the third antenna element 20C respectively opposed to the first region 55A, the second region 55B, and the third region 55C facing in different directions. Therefore, a beamforming range can be extended in three different directions.

When beamforming in an outward direction to which the first corner portion 53A is directed (diagonally upper right in FIG. 10) is intended, the first antenna element 20A, and the second antenna element 20B arranged at the position closer to the first region 55A may be operated as a single array antenna. At this time, a side lobe and a grating lobe can be suppressed. When beamforming in an outward direction to which the third corner portion 53C is directed (diagonally lower right in FIG. 10) is intended, the third antenna element 20C, and the second antenna element 20B arranged at the position closer to the third region 55C may be operated as a single array antenna. Also at this time, a side lobe and a grating lobe can be suppressed.

Eighth Example

Next, an antenna device according to an eighth example is described with reference to FIGS. 11A and 11B. Hereinafter, description of configurations in common with the antenna device according to the first example which is described with reference to the drawings from FIGS. 1A to 2 is omitted.

Figure 11A:
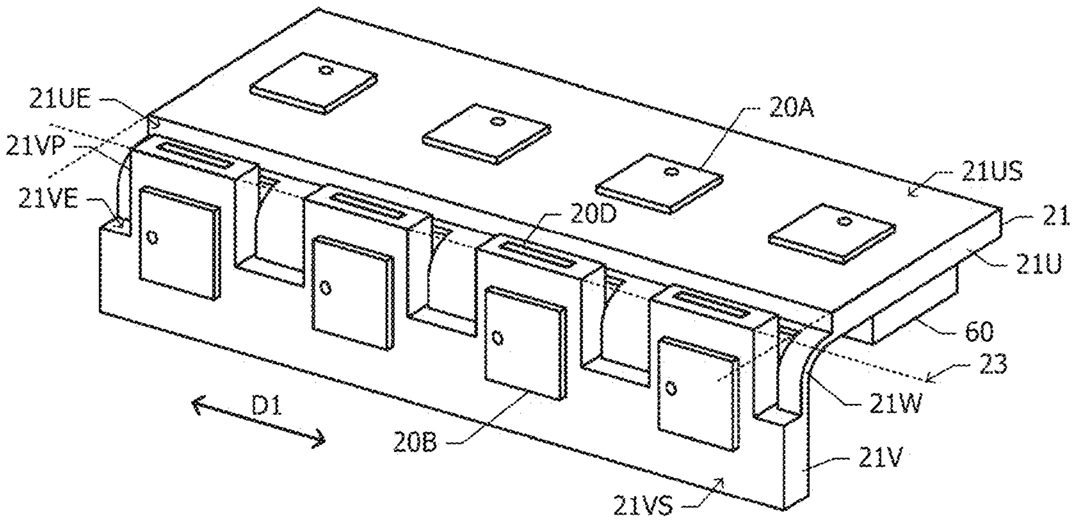
FIG. 11A is a perspective view of a substrate used for an antenna device according to an eighth example, and an antenna element provided to the substrate.

FIG. 11A is a perspective view of the substrate 21 used for the antenna device according to the eighth example, and an antenna element provided to the substrate 21. The substrate 21 includes a first flat portion 21U, a second flat portion 21V, and a curving portion 21W connecting therebetween. The curving portion 21W is thinner than the first flat portion 21U and the second flat portion 21V. The first flat portion 21U and the second flat portion 21V respectively have a first surface 21US and a second surface 21VS that are flat. The first surface 21US and the second surface 21VS face to a space on the same side as a space to which an outer surface of the curving portion 21W faces. A virtual plane including the first surface 21US and a virtual plane including the second surface 21VS intersect one another at a right angle.

A direction in parallel to an intersection line 23 between the virtual plane including the first surface 21US and the virtual plane including the second surface 21VS is referred to as a first direction D1. The first flat portion 21U and the second flat portion 21V respectively have side surfaces 21UE and 21VE extending in a direction parallel to the first direction D1. The side surface 21VE of the second flat portion 21V is connected, at a partial range in the first direction D1, to the curving portion 21W. The second flat portion 21V has, at a range not connected to the curving portion 21W in relation to the first direction D1, a plurality of projecting portions 21VP projecting, with respect to the side surface 21VE, toward the intersection line 23. Such a substrate 21 can be made in a method described in the specification of International Publication No. 2020/170722, for example.

The plurality of first antenna elements 20A are disposed on the first surface 21US of the first flat portion 21U, and the plurality of second antenna elements 20B are disposed on the second surface 21VS of the second flat portion 21V. In FIG. 11A, a feeding point of each first antenna element 20A and second antenna element 20B is indicated by a circle mark. The plurality of first antenna elements 20A are arranged side by side in the first direction D1. The plurality of second antenna elements 20B are disposed within the corresponding ranges where the projecting portions 21VP are provided in relation to the first direction D1, and a partial range of each second antenna element 20B is positioned at the second surface 21VS of the projecting portion 21VP.

Each of the plurality of projecting portions 21VP has a tip end where a fourth antenna element 20D is disposed. As the fourth antenna element 20D, a dipole antenna extending in the first direction D1 is used. On a surface of the first flat portion 21U on the opposite side from the first surface 21US, a radio frequency integrated circuit (RFIC) 60 is mounted. Radio frequency signals are supplied from the radio frequency integrated circuit 60 to each of the first antenna element 20A, the second antenna element 20B, and the fourth antenna element 20D via a plurality of feeder lines provided to the first flat portion 21U, the curving portion 21W, and the second flat portion 21V.

Figure 11B:
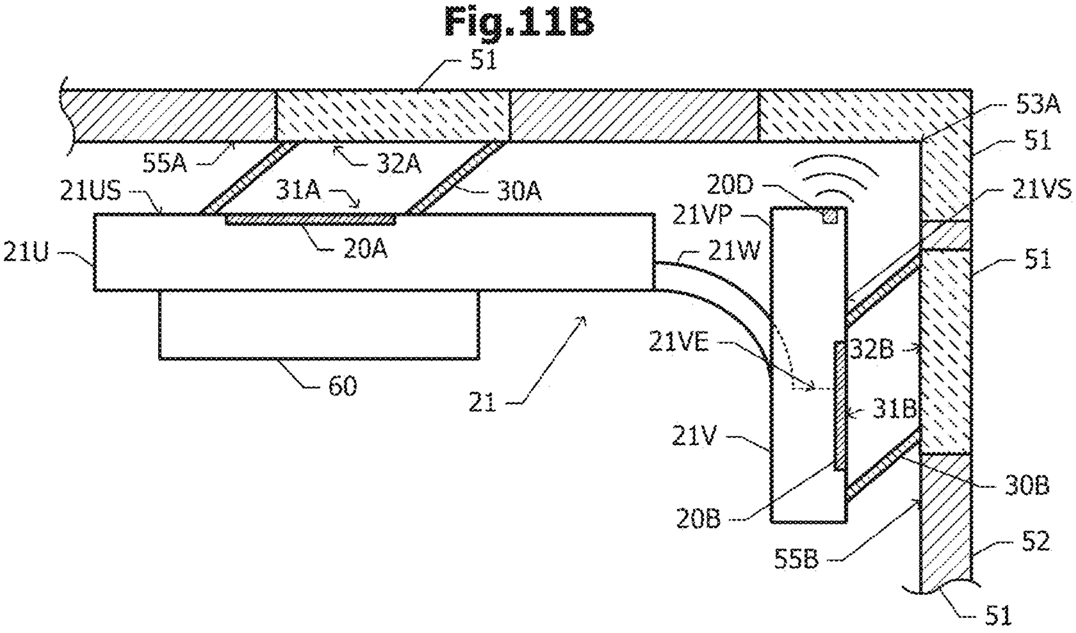
FIG. 11B is a sectional view of the antenna device according to the eighth example.

FIG. 11B is a sectional view of the antenna device according to the eighth example. The casing 50 accommodates the substrate 21 where the first antenna element 20A, the second antenna element 20B, and the fourth antenna element 20D are disposed. The first surface 21US of the first flat portion 21U and the second surface 21VS of the second flat portion 21V are respectively opposed to the first region 55A and the second region 55B of the inner surface of the casing 50. The first waveguide 30A extends from each of the plurality of first antenna elements 20A to the first region 55A. The second waveguide 30B extends from each of the plurality of second antenna elements 20B to the second region 55B. The positional relationship between the antenna-side end surface 31A and the casing-side end surface 32A of the first waveguide 30A, and the positional relationship between the antenna-side end surface 31B and the casing-side end surface 32B of the second waveguide 30B are similar to the positional relationship therebetween in the antenna device (FIG. 1A) according to the first example.

The window 51 made of a material (for example, a dielectric material) that allows a radio wave radiated from the fourth antenna element 20D to pass therethrough is provided to the first corner portion 53A. The radio wave radiated from the fourth antenna element 20D passes the window 51 of the first corner portion 53A, and is radiated outside of the casing 50.

Next, a beneficial effect of the eighth example is described.

The first waveguide 30A is inclined such that the casing-side end surface 32A of the first waveguide 30A is brought closer to the first corner portion 53A. Therefore, a gap between the casing-side end surface 32A of the first waveguide 30A coupled to the first antenna element 20A and the window 51 of the first corner portion 53A through which the radio wave radiated from the fourth antenna element 20D passes becomes narrower. Thereby, in a case in which the first antenna element 20A and the fourth antenna element 20D are operated to perform beamforming, a side lobe and a grating lobe can be suppressed.

Similarly, in a case in which the second antenna element 20B and the fourth antenna element 20D are operated to perform beamforming, a side lobe and a grating lobe can be suppressed. Furthermore, also in a case in which the first antenna element 20A, the second antenna element 20B, and the fourth antenna element 20D are operated to perform beamforming, a side lobe and a grating lobe can be suppressed.

Next, a modification of the eighth example is described. The first flat portion 21U and the second flat portion 21V of the substrate 21 may respectively be attached to the first region 55A and the second region 55B by adhesive. In this case, a layer made of the adhesive functions as a waveguide. In the case in which the layer made of adhesive is used as the waveguide, the waveguide is not limited to have an inclined structure like the first waveguide 30A and the second waveguide 30B illustrated in FIG. 11B. Also, in the configuration in which the waveguide is not inclined, by the fourth antenna element 20D being disposed between the first antenna element 20A and the second antenna element 20B, the gap between the adjacent antenna elements is made narrower. Thereby, a side lobe and a grating lobe can be suppressed. Note that it is also possible to realize the inclined structure like the first waveguide 30A and the second waveguide 30B illustrated in FIG. 11B, by using the layer made of adhesive.

Ninth Example

Next, an antenna device according to a ninth example is described with reference to FIG. 12. Hereinafter, description of configurations in common with the antenna device according to the first example which is described with reference to the drawings from FIGS. 1A to 2 is omitted.

Figure 12:
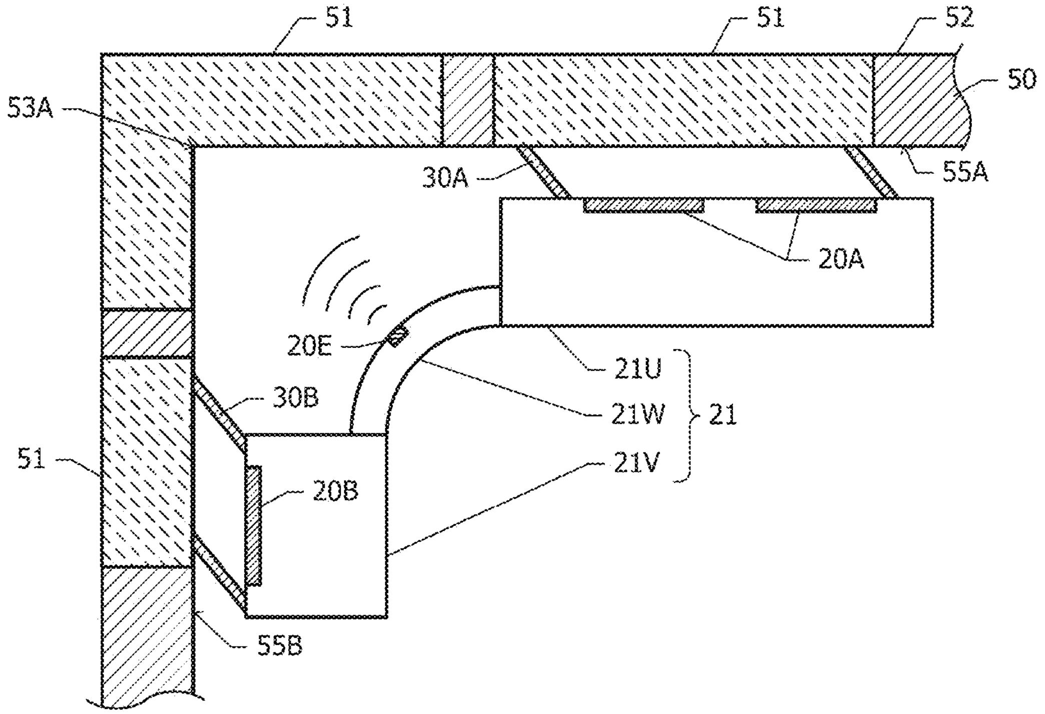
FIG. 12 is a sectional view of an antenna device according to a ninth example.

FIG. 12 is a sectional view of the antenna device according to the ninth example. The substrate 21 used for the antenna device according to the ninth example includes the first flat portion 21U, the second flat portion 21V, and the curving portion 21W connecting therebetween. The substrate 21 may be made, for example, by one rigid substrate being partially made thinner, and the thinned portion being curved. Alternatively, two rigid substrates may be connected to one another with a flexible substrate interposed therebetween.

The plurality of first antenna elements 20A disposed at the first flat portion 21U are opposed to the first region 55A of the inner surface of the casing 50. The second antenna element 20B disposed at the second flat portion 21V is opposed to the second region 55B of the inner surface of the casing 50. The outer surface of the curving portion 21W is opposed to the first corner portion 53A of the casing 50. A fifth antenna element 20E is disposed at the curving portion 21W. As the fifth antenna element 20E, for example, a dipole antenna is used. The fifth antenna element 20E is opposed to an inner surface of the first corner portion 53A. The window 51 made of a material (for example, a dielectric material) that allows a radio wave radiated from the fifth antenna element 20E to pass therethrough is provided to the first corner portion 53A. The radio wave radiated from the fifth antenna element 20E passes the window 51 of the first corner portion 53A and is radiated outside of the casing 50.

The first waveguide 30A and the second waveguide 30B are respectively coupled to the first antenna element 20A and the second antenna element 20B. The first waveguide 30A and the second waveguide 30B incline similarly to the first waveguide 30A and the second waveguide 30B of the antenna device according to the first example (FIG. 1A).

Next, a beneficial effect of the ninth example is described.

Also in the ninth example, similarly to the fourth antenna element 20D of the eighth example (FIGS. 11A and 11B), the fifth antenna element 20E opposed to the first corner portion 53A is provided. Therefore, a side lobe and a grating lobe can be suppressed. Moreover, since the antenna elements facing in three different directions can simultaneously be used, a beamforming range can be extended.

The first flat portion 21U and the second flat portion 21V of the substrate 21 may respectively be attached to the first region 55A and the second region 55B by adhesive. In this case, a layer made of the adhesive functions as a waveguide. In the case in which the layer made of adhesive is used as the waveguide, the waveguide is not limited to have an inclined structure like the first waveguide 30A and the second waveguide 30B illustrated in FIG. 12. Also in the configuration, by the fifth antenna element 20E being disposed between the first antenna element 20A and the second antenna element 20B, the gap between the adjacent antenna elements is made narrower. Thereby, a side lobe and a grating lobe can be suppressed. Note that it is also possible to form the inclined structure like the first waveguide 30A and the second waveguide 30B illustrated in FIG. 12, by using the layer made of adhesive.

Next, a first modification of the ninth example is described with reference to FIG. 13A.

Figure 13A:
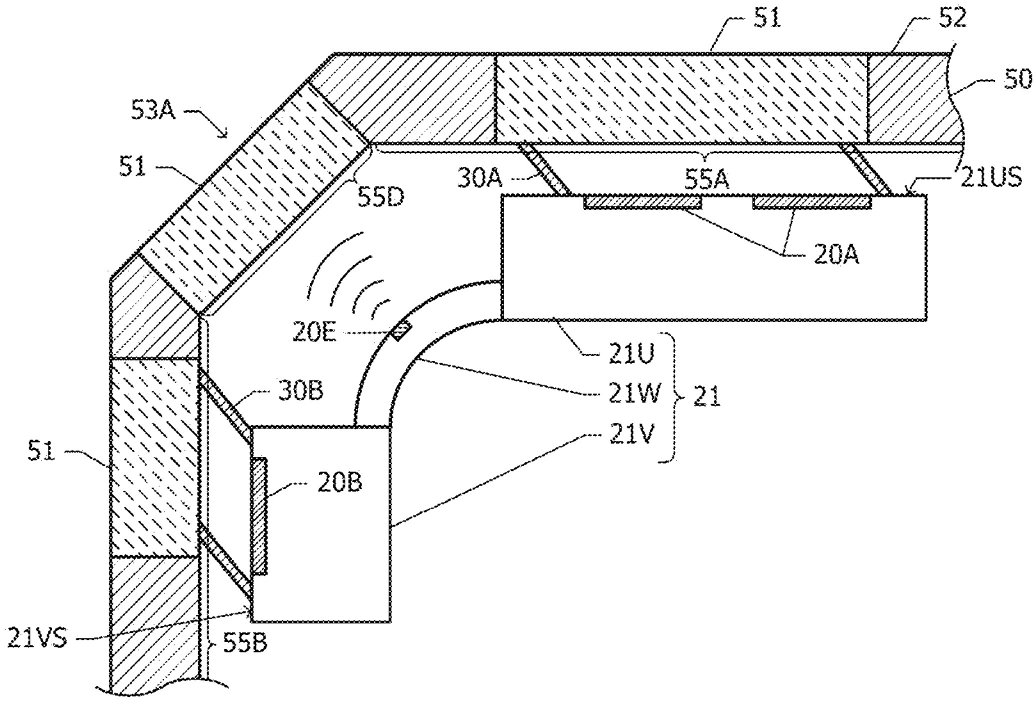
FIG. 13A is a sectional view of an antenna device according to a first modification of the ninth example.

FIG. 13A is a sectional view of an antenna device according to the first modification of the ninth example. In the ninth example (FIG. 12), the first region 55A and the second region 55B intersect one another at a substantially right angle at the first corner portion 53A. In this respect, in the first modification illustrated in FIG. 13A, the inner surface of the first corner portion 53A includes an inclined region 55D which has inclination with respect to both the first region 55A and the second region 55B. An outer surface of the casing 50 has a shape chamfered at the first corner portion 53A.

Next, a second modification of the ninth example is described with reference to FIG. 13B.

Figure 13B:
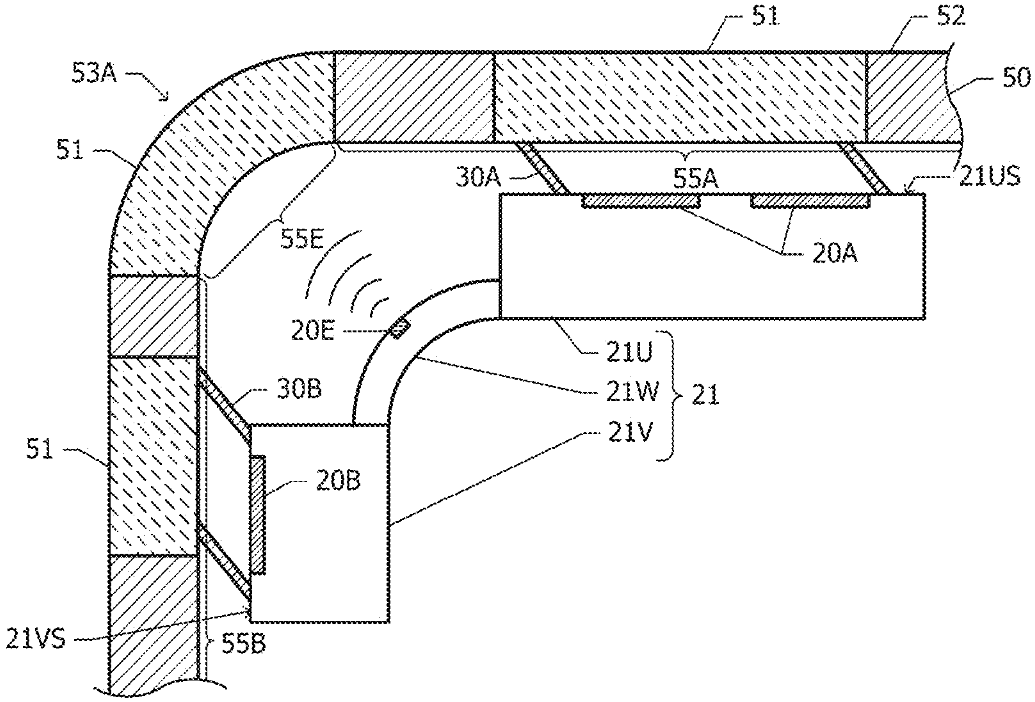
FIG. 13B is a sectional view of an antenna device according to a second modification of the ninth example.

FIG. 13B is a sectional view of an antenna device according to the second modification of the ninth example. In the second modification, the inner surface of the first corner portion 53A includes a curved region 55E formed by a curved surface in which the inner surface of the first corner portion 53A is curved. The first region 55A and the curved region 55E, and the second region 55B and the curved region 55E are smoothly connected to one another. The outer surface of the casing 50 has a shape R-chamfered at the first corner portion 53A.

The window 51 made of a material (for example, a dielectric material) that allows a radio wave radiated from the fifth antenna element 20E to pass therethrough is provided to a region, of the casing 50, corresponding to the inclined region 55D or the curved region 55E. As described above, the first corner portion 53A may be provided with the inclined region 55D or the curved region 55E.

Next, a third modification of the ninth example is described with reference to FIG. 14.

Figure 14:
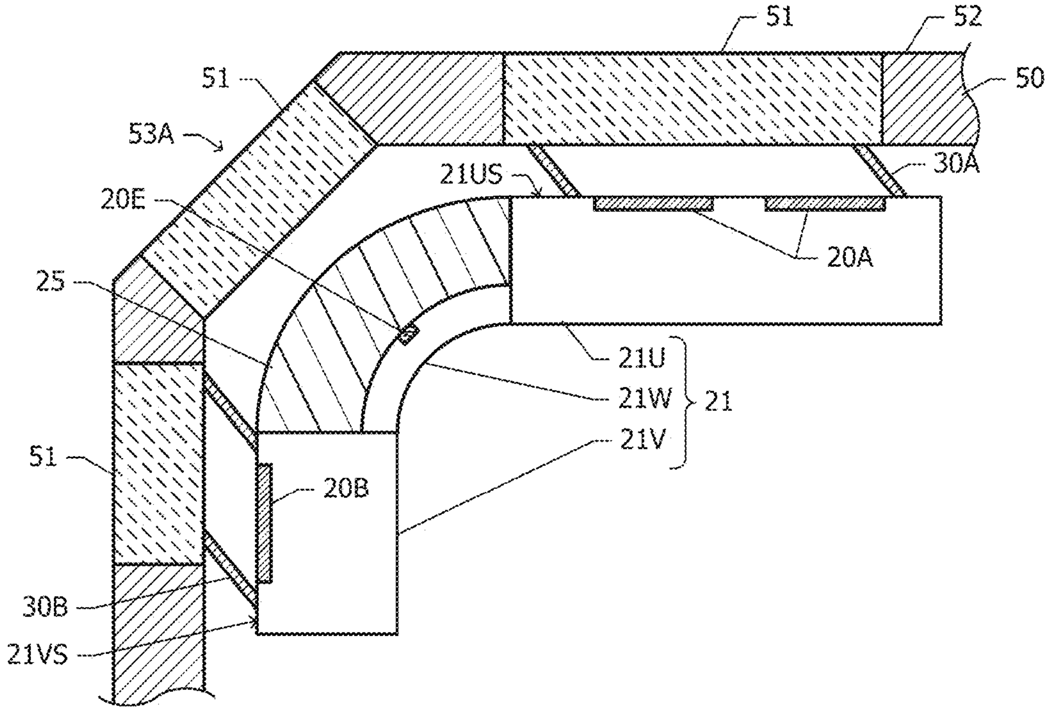
FIG. 14 is a sectional view of an antenna device according to a third modification of the ninth example.

FIG. 14 is a sectional view of an antenna device according to the third modification of the ninth example. In the third modification, a resin member 25 in close contact with an outer surface of the curving portion 21W of the antenna device according to the first modification illustrated in FIG. 13A is provided. By the resin member 25 being provided, the fifth antenna element 20E can be made to have a wider band width. Moreover, mechanical strength of the curving portion 21W can be improved. For example, improvement in the mechanical strength of the curving portion 21W can bring a beneficial effect that a work to accommodate the substrate 21 in the casing 50 becomes easier.

Next, a fourth modification of the ninth example is described with reference to FIG. 15.

Figure 15:
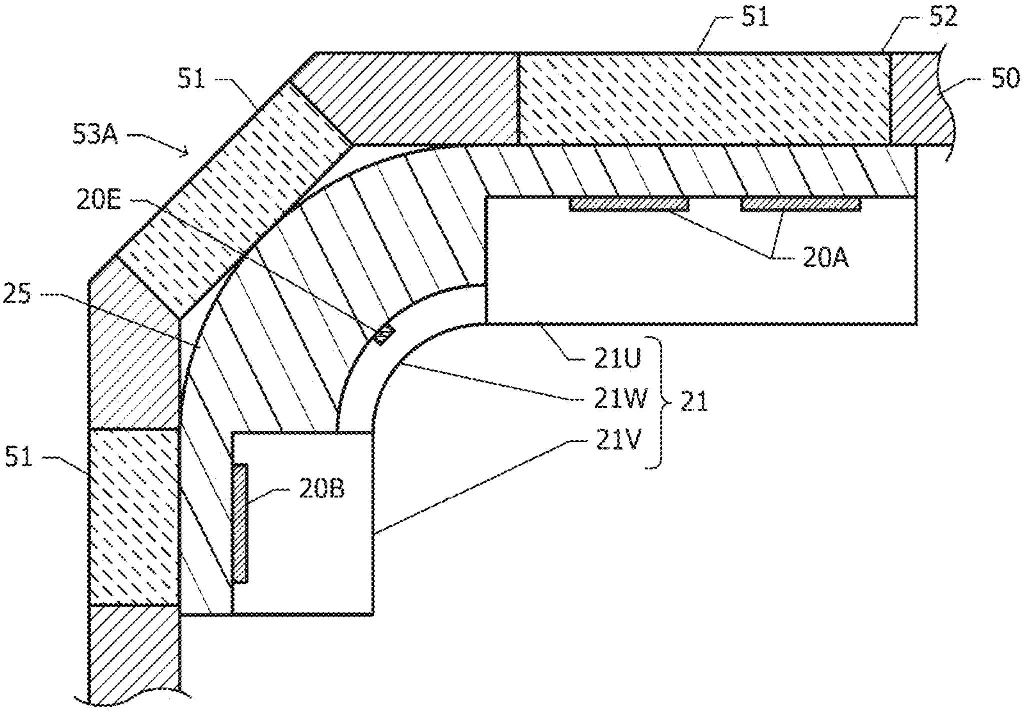
FIG. 15 is a sectional view of an antenna device according to a fourth modification of the ninth example.

FIG. 15 is a sectional view of an antenna device according to the fourth modification of the ninth example. In the third modification (FIG. 14) of the ninth example, the resin member 25 is in close contact with the outer surface of the curving portion 21W, and the resin member 25 is not disposed on the first surface 21US of the first flat portion 21U and on the second surface 21VS of the second flat portion 21V. In this respect, in the fourth modification of the ninth example, the resin member 25 is in close contact also with the first surface 21US of the first flat portion 21U and on the second surface 21VS of the second flat portion 21V.

The resin member 25 on the curving portion 21W, and the resin member 25 on the first flat portion 21U and the second flat portion 21V are formed integrally, for example. Note that the resin member 25 may be made in close contact with the curving portion 21W like the antenna device according to the third modification of the ninth example illustrated in FIG. 14, and after that, the resin member 25 may be made in close contact with the entire substrate 21 including the first flat portion 21U and the second flat portion 21V.

The resin member 25 functions as adhesive, and the substrate 21 is attached to the casing 50 by the resin member 25. In this configuration, the resin member 25 functions as a waveguide for radio waves radiated from the first antenna element 20A, the second antenna element 20B, and the fifth antenna element 20E. In the fourth modification of the ninth example, mechanical strength of the substrate 21 can be improved more. Furthermore, the first antenna element 20A, the second antenna element 20B, and the fifth antenna element 20E can be made to have a wider band width.

Tenth Example

Next, a communication device according to a tenth example is described with reference to FIG. 16. The communication device according to the tenth example includes the antenna device according to any of the examples from the first example to the ninth example, or the modifications thereof.

Figure 16:
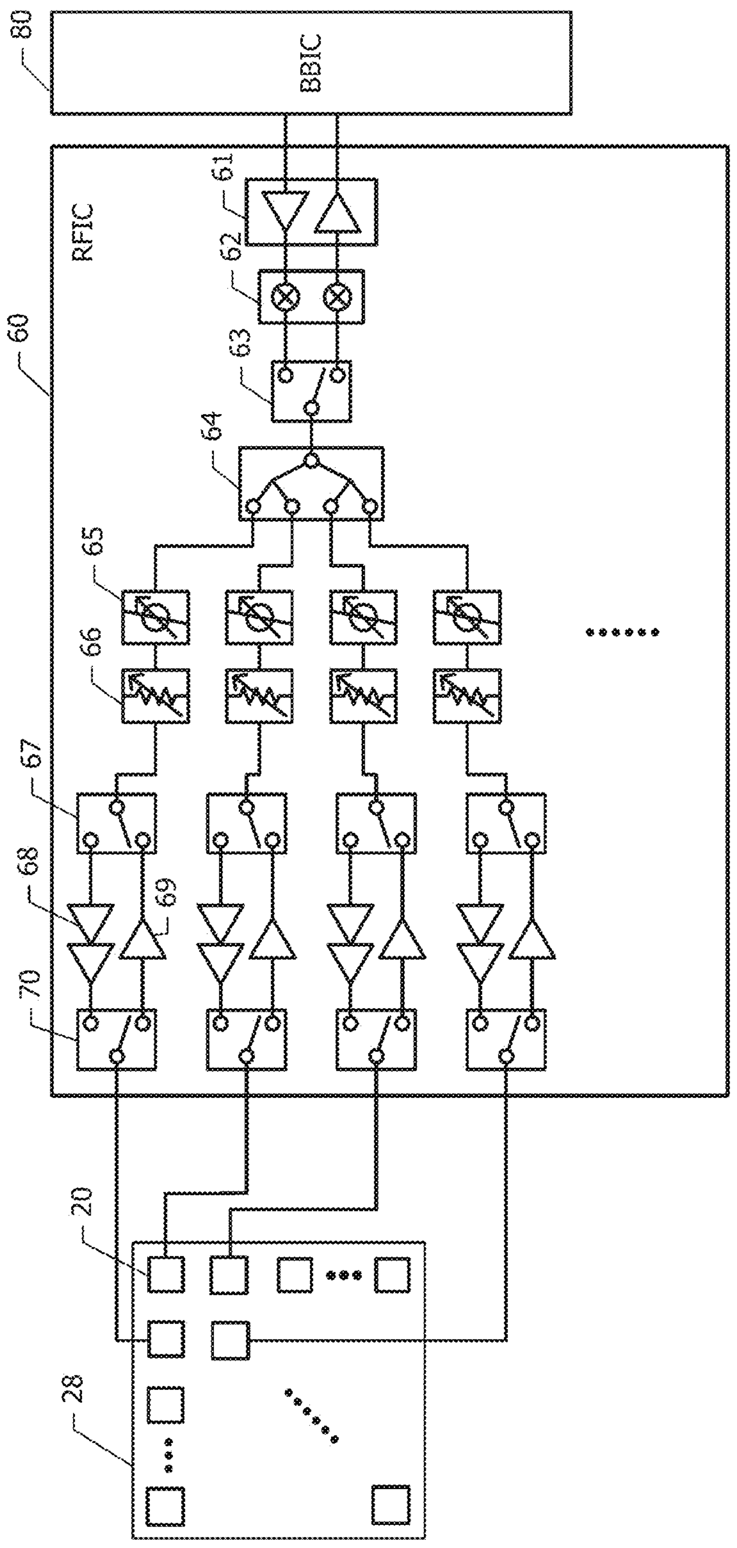
FIG. 16 is a block diagram of a communication device according to a tenth example.

FIG. 16 is a block diagram of the communication device according to the tenth example.

The communication device according to the tenth example includes a baseband integrated circuit (BBIC) 80, a radio frequency integrated circuit (RFIC) 60, and an antenna device 28. As the antenna device 28, the antenna device according to any of the examples from the first example to the ninth example, or the modifications thereof is used. The antenna device 28 includes a plurality of antenna elements 20. The plurality of antenna elements 20 include, for example, the first antenna element 20A and the second antenna element 20B of the first example (FIG. 1A) and so on, the third antenna element 20C of the sixth example (FIG. 9A) and so on, the fourth antenna element 20D of the eighth example (FIGS. 11A and 11B), and the fifth antenna element 20E of the ninth example (FIG. 12).

The baseband integrated circuit 80 and the radio frequency integrated circuit 60 are accommodated in the casing 50 which is in common with the casing 50 (FIG. 1A and so on) of the antenna device 28. For example, the radio frequency integrated circuit 60 is mounted on the L-shaped substrate 21L of the antenna device according to the modification of the first example illustrated in FIG. 4. Alternatively, the radio frequency integrated circuit 60 is mounted at the first flat portion 21U of the substrate 21 of the antenna device according to the eighth example illustrated in FIG. 11A.

The radio frequency integrated circuit 60 includes an intermediate frequency amplifier 61, an up-and-down converter mixer 62, a transmission-and-reception selector switch 63, a power divider 64, a plurality of phase shifters 65, a plurality of attenuators 66, a plurality of transmission-and-reception selector switches 67, a plurality of power amplifiers 68, a plurality of low noise amplifiers 69, and a plurality of transmission-and-reception selector switches 70.

First, a transmission function is described. An intermediate frequency signal is inputted from the baseband integrated circuit 80 into the up-and-down converter mixer 62 with the intermediate frequency amplifier 61 interposed therebetween. The up-and-down converter mixer 62 up-converts the intermediate frequency signal to generate a radio frequency signal. The generated radio frequency signal is inputted into the power divider 64 with the transmission-and-reception selector switch 63 interposed therebetween. Each radio frequency signal split by the power divider 64 is inputted into the antenna element 20 via the phase shifter 65, the attenuator 66, the transmission-and-reception selector switch 67, the power amplifier 68, and the transmission-and-reception selector switch 70.

Next, a reception function is described. A radio frequency signal received by each of the plurality of antenna elements 20 is inputted into the power divider 64 via the transmission-and-reception selector switch 70, the low noise amplifier 69, the transmission-and-reception selector switch 67, the attenuator 66, and the phase shifter 65. A radio frequency signal combined by the power divider 64 is inputted into the up-and-down converter mixer 62 via the transmission-and-reception selector switch 63. The up-and-down converter mixer 62 down-converts the radio frequency signal to generate an intermediate frequency signal. The generated intermediate frequency signal is inputted into the baseband integrated circuit 80 via the intermediate frequency amplifier 61. Note that a direct conversion method in which the up-and-down converter mixer 62 directly down-converts the radio frequency signal into a baseband signal may be adopted.

Next, a beneficial effect of the tenth example is described.

As the antenna device 28 included in the communication device according to the tenth example, the antenna device of any of the examples from the first example to the ninth example, or the modifications thereof is used, and thus a beamforming range can be extended. Furthermore, a side lobe and a grating lobe can be suppressed.

Each example described above is merely illustration, and needless to say, partial replacement or combination of the configurations presented in the different examples is possible. Similar operation and effects attributed to the similar configurations in the plurality of examples are not mentioned one by one. Furthermore, the present disclosure is not limited to the examples described above. For example, it is obvious to the person skilled in the art that various changes, improvements, combinations, and the like are possible.

REFERENCE SIGNS LIST

20 antenna element
20A first antenna element
20B second antenna element
20C third antenna element
20D fourth antenna element
20E fifth antenna element
21 substrate
21A first substrate
21B second substrate

21C third substrate
21L L-shaped substrate
21U substrate first flat portion
21UE first flat portion side surface connected to curving portion
21US first surface
21V substrate second flat portion
21VE second flat portion side surface connected to curving portion
21VP projecting portion
21VS second surface
21W substrate curving portion
23 intersection line
25 resin member
28 antenna device
30A first waveguide
30B second waveguide
30C third waveguide
31A, 31B, 31C antenna-element-side end surface of waveguide
32A, 32B, 32C casing-side end surface of waveguide
31AI perpendicular projection image of first waveguide on first region
50 casing
51 window
52 metal wall
53A first corner portion
53B second corner portion
53C third corner portion
55A first region of casing inner surface
55AV virtual plane including first region
55B second region of casing inner surface
55C third region of casing inner surface
55D inclined region of casing inner surface
55E curved region of casing inner surface
60 radio frequency integrated circuit (RFIC)
61 intermediate frequency amplifier
62 up-and-down converter mixer
63 transmission-and-reception selector switch
64 power divider
65 phase shifter
66 attenuator
67 transmission-and-reception selector switch
68 power amplifier
69 low noise amplifier
70 transmission-and-reception selector switch
80 baseband integrated circuit

The invention claimed is:

1. An antenna device comprising:

a casing including an inner surface including a first region and a second region connected to one another with a first corner portion interposed therebetween;

at least one first antenna element accommodated in the casing and opposed to the first region with a gap therebetween;

at least one second antenna element accommodated in the casing and opposed to the second region with a gap therebetween;

at least one first waveguide configured to extend from the first antenna element toward the first region; and at least one second waveguide configured to extend from the second antenna element toward the second region; wherein compared to an image obtained by a perpendicular projection of an end surface of the first waveguide on a side closest to the first antenna element on a virtual plane including the first region, an end surface of the first waveguide on a side closest to the inner surface of the casing is positioned adjacent to the first corner portion, and compared to an image obtained by a perpendicular projection of an end surface of the second waveguide on a side closest to the second antenna element on a virtual plane including the second region, an end surface of the second waveguide on a side closest to the inner surface of the casing is positioned adjacent to the first corner portion.

2. The antenna device according to claim 1, wherein a gap between a geometric center of the end surface of the first waveguide on the side closest to the inner surface of the casing and a geometric center of the end surface of the second waveguide on the side closest to the inner surface of the casing is narrower than a gap between a geometric center of the end surface of the first waveguide on the side closest to the first antenna element and a geometric center of the end surface of the second waveguide on the side closest to the second antenna element.

3. The antenna device according to claim 1, wherein the first waveguide and the second waveguide are metal waveguides.

4. The antenna device according to claim 1, wherein the first waveguide and the second waveguide are dielectric waveguides.

5. The antenna device according to claim 1, wherein a plurality of the first antenna elements are provided in the casing, and the first waveguide is disposed for each of the first antenna elements.

6. The antenna device according to claim 1, wherein a plurality of the first antenna elements are provided in the casing, and one of the at least one of the first waveguide is disposed in correspondence with one of the plurality of the first antenna elements.

7. The antenna device according to claim 1, wherein the casing includes a third region connected to the first region and the second region with a second corner portion and a third corner portion interposed therebetween, respectively, the antenna device further comprises:

at least one third antenna element accommodated in the casing and opposed to the third region with a gap therebetween, and at least one third waveguide extending from the third antenna element toward the third region, and compared to an image obtained by a perpendicular projection of an end surface of the third waveguide on a side closest to the third antenna element on a virtual plane including the third region, an end surface of the third waveguide on a side closest to the inner surface of the casing is positioned adjacent to the third corner portion.

8. The antenna device according to claim 1, further comprising:

a substrate accommodated in the casing; and a fourth antenna element disposed at the substrate, wherein the substrate includes:

a first flat portion that has a first surface on which the first antenna element is disposed, and the first surface being opposed to the first region, a second flat portion that has a second surface on which the second antenna element is disposed, and the second surface being opposed to the second region, and a curving portion connecting the first flat portion and the second flat portion, a side surface of the second flat portion is connected, at a partial range in relation to a first direction, to the curving portion, the first direction being in parallel to an intersection line between a virtual plane including the first surface and a virtual plane including the second surface, and the side surface extending in the first direction, the second flat portion includes, at a range not connected to the curving portion in relation to the first direction, a projecting portion projecting, with respect to the side surface connected to the curving portion, toward the intersection line, the fourth antenna element is disposed at a tip end of the projecting portion, and the first corner portion allows a radio wave radiated from the fourth antenna element to pass therethrough.

9. The antenna device according to claim 1, further comprising:

a substrate on which the first antenna element and the second antenna element are mounted, wherein the substrate includes a portion that is opposed to the first region and at which the first antenna element is disposed, a portion that is opposed to the second region and at which the second antenna element is disposed, and a curving portion connecting both the portions, the antenna device further comprises a fifth antenna element disposed at the curving portion and opposed to an inner surface of the first corner portion, and the first corner portion allows a radio wave radiated from the fifth antenna element to pass therethrough.

10. The antenna device according to claim 9, further comprising: a resin member in contact with a surface of the curving portion, the surface of the curving portion facing toward the first corner portion.

11. A communication device comprising:

the antenna device according to claim 1; and a radio frequency integrated circuit configured to supply a radio frequency signal to at least the first antenna element and the second antenna element of the antenna device.

12. The communication device according to claim 11, further comprising:

a baseband integrated circuit configured to supply a signal to the radio frequency integrated circuit, wherein the radio frequency circuit converts the signal supplied by the baseband integrated circuit to the radio frequency signal.

13. The communication device according to claim 12, wherein the radio frequency integrated circuit includes at least:

a mixer configured to convert the signal supplied by the baseband integrated circuit into the radio frequency signal, and a power amplifier configured to amplify the radio frequency signal.

14. The communication device according to claim 13, wherein the mixer of the radio frequency integrated circuit is configured to convert a received radio frequency signal into a received signal of a lower frequency than the received radio frequency signal, and the radio frequency integrated circuit supplies the received signal to the baseband integrated circuit.

15. The communication device according to claim 14, wherein the radio frequency integrated circuit further includes a selector configured to select between signal transmission and reception.

16. The communication device according to claim 12, wherein the radio frequency integrated circuit and the baseband integrated circuit are both included in the casing.

17. The communication device according to claim 16, wherein the antenna device further comprises a substrate accommodated in the casing, and the radio frequency integrated circuit is disposed on the substrate.

18. The communication device according to claim 17, wherein the substrate includes a first flat portion and a second flat portion interconnected by a curved portion, and the radio frequency integrated circuit is disposed on one of the first flat portion or the second flat portion.

19. The communication device according to claim 18, wherein the radio frequency integrated circuit provides the radio frequency signal to at least the first antenna element and the second antenna element via feeder lines disposed in the curved portion of the substrate.

20. The communication device according to claim 19, wherein the curved portion is thinner than the first flat portion and the second flat portion.

* * * * *